United States Patent
Wagner et al.

(10) Patent No.: US 10,203,255 B2
(45) Date of Patent: Feb. 12, 2019

(54) DIFFERENTIAL PRESSURE SENSOR INCORPORATING COMMON MODE ERROR COMPENSATION

(71) Applicant: MEASUREMENT SPECIALTIES, INC., Hampton, VA (US)

(72) Inventors: David E. Wagner, Los Gatos, CA (US); James H. Hoffman, Santa Clara, CA (US); Natasha V. Kachenko, Palo Alto, CA (US)

(73) Assignee: Measurement Specialties, Inc., Hampton, VA (US)

( * ) Notice: Subject to any disclaimer, the term of this patent is extended or adjusted under 35 U.S.C. 154(b) by 197 days.

(21) Appl. No.: 15/247,532

(22) Filed: Aug. 25, 2016

(65) Prior Publication Data

US 2018/0058963 A1 Mar. 1, 2018

(51) Int. Cl.
| | |
|---|---|
| *G01L 9/06* | (2006.01) |
| *G01L 9/08* | (2006.01) |
| *G01L 13/02* | (2006.01) |
| *G01L 19/02* | (2006.01) |
| *G01L 19/04* | (2006.01) |
| *G01L 19/06* | (2006.01) |
| *G01L 27/00* | (2006.01) |
| *G01L 9/00* | (2006.01) |
| *G01L 19/14* | (2006.01) |
| *G01L 15/00* | (2006.01) |

(52) U.S. Cl.
CPC .......... *G01L 9/0054* (2013.01); *G01L 13/025* (2013.01); *G01L 15/00* (2013.01); *G01L 19/14* (2013.01); *G01L 27/002* (2013.01)

(58) Field of Classification Search
CPC . G01L 9/00; G01L 9/0054; G01L 9/06; G01L 9/08; G01L 13/02; G01L 13/025; G01L 15/00; G01L 19/00–19/06; G01L 19/14; G01L 27/00; G01L 27/002
See application file for complete search history.

(56) References Cited

U.S. PATENT DOCUMENTS 4,287,501 A * 9/1981 Tominaga ........... G01L 19/0038
257/419
4,322,980 A * 4/1982 Suzuki .................. G01L 9/0054
128/204.23

(Continued)

FOREIGN PATENT DOCUMENTS

| EP | 1009986 A1 | 6/2000 | |
|---|---|---|---|
| EP | 1970688 A2 | 7/2008 | |
| JP | 2006071501 A * | 3/2006 | ............... G01L 9/00 |

*Primary Examiner* — Nguyen Q. Ha
(74) *Attorney, Agent, or Firm* — Howard IP Law Group

(57) ABSTRACT

A differential pressure sensor may provide a common mode corrected differential pressure reading. The differential pressure sensor may include two pressure sensing diaphragms. The pressure sensor may be configured so that the first diaphragm measures the differential pressure between two sections of a fluid. The pressure sensor may also be configured so that the second diaphragm measures the common mode error experienced by the die at the time the differential pressure is read by the first diaphragm. Electrical connectors may be configured so that the differential pressure outputs a common mode error corrected differential pressure reading based on the readings of the first and second diaphragm.

20 Claims, 13 Drawing Sheets

(56) References Cited

U.S. PATENT DOCUMENTS

| | | | | |
|---|---|---|---|---|
| 4,565,097 | A | * | 1/1986 | Dimeff ................... G01L 9/045 323/367 |
| 5,437,189 | A | * | 8/1995 | Brown .................. G01L 9/0055 73/708 |
| 5,959,213 | A | * | 9/1999 | Ikeda ................... G01L 9/0054 73/717 |
| 6,023,978 | A | * | 2/2000 | Dauenhauer ............ G01L 9/045 338/42 |
| 7,644,625 | B2 | | 1/2010 | Ricks |
| 8,770,034 | B2 | | 7/2014 | Bentley et al. |
| 2004/0245585 | A1 | * | 12/2004 | Johnson .................... G01L 9/06 257/414 |
| 2009/0282925 | A1 | * | 11/2009 | Machir ................. G01L 19/148 73/756 |
| 2011/0239772 | A1 | * | 10/2011 | Kurtz ................... G01L 9/0055 73/721 |
| 2013/0125659 | A1 | * | 5/2013 | Crivelli ................ G01L 9/0052 73/721 |
| 2016/0109315 | A1 | * | 4/2016 | Nguyen ................ G01L 13/025 73/708 |

\* cited by examiner

DIFFERENTIAL PRESSURE SENSOR INCORPORATING COMMON MODE ERROR COMPENSATION

FIELD OF THE INVENTION

The application relates to sensors. More particularly, the application relates to sensors for detecting differential pressures of fluids.

BACKGROUND OF THE INVENTION

Differential pressure sensors measure a difference in pressure between two points of measurement (e.g. P1 and P2) of a fluid. A differential pressure sensor (or transducer) converts the pressure difference to an electrical signal that can be measured to determine the differential pressure. For example, a differential pressure sensor may be used in an oil pipe to measure the pressure before and after an orifice in the oil pipe, from which the flow rate of the oil can be determined. Such devices are typically manufactured using micro-machined or Micro-Electro-Mechanical System (MEMS) based techniques. One common technique for manufacturing a pressure sensor is to attach a MEMS device onto a substrate, such as a ceramic or printed circuit board (PCB) substrate, along with etching and bonding techniques to fabricate very small, inexpensive devices.

The pressure-sensing die may typically be formed from a semiconductor material such as silicon. FIG. 1 is a sectional view of a MEMS type pressure sensing die 100 of the prior art. The die 100 maybe formed from a silicon wafer by methods such as dicing to produce a silicon structure 101. The structure 101 is thinned to create a cavity 105 and a thinned portion defining a diaphragm 103. The semiconductor structure 101 may be thinned by any suitable means. For example, the structure 101 may be thinned using anisotropic etching as known in the art. Resistive elements are formed on the surface of the diaphragm 103. The resistive elements exhibit resistance that is proportional to the strain placed on the thinned semiconductor material forming the diaphragm 103.

FIG. 2 is an illustration of a prior art differential MEMS pressure sensor using pressure sensing die/device 100. Pressure sensing device 100 may be mounted to a support structure 207 which is, in turn bonded to a base plate 201, which may be formed from a non-corroding material, for example, stainless steel. The sensing die 100 and the support structure 207 may be bonded to base plate 201, which may also be termed a header, by an adhesive 205. The support structure 207 is used as it isolates the pressure sensing device 100 from sources of strain that are unrelated to pressure, such as thermal expansion which varies between the pressure sensing device 100 and the base plate 201. An opening 203 is defined in the base plate 201 defining an aperture which is in gas or fluid communication with the underside of the diaphragm of pressure sensing device 100. The opening 203 is in communication with a first gas or fluid whose pressure PI is to be measured and which comes in contact with one side of the pressure sensing device 100. The pressure sensing die 100 is attached to the base plate 201 over the opening 203 via support structure 207. Support structure 207 may be formed from glass or similar material which has a coefficient of thermal expansion closer to that of the silicon pressure sensing die 100 as compared to the coefficient of thermal expansion of the stainless steel making up the base plate 201. This matching of the coefficients of thermal expansion prevents exertion of forces on the die 100 not related to pressure, but rather, caused by the strain related to the dissimilar rates of expansion between the die 100 and the base plate 201. The constraint 207 is attached to the base plate 201 by an appropriate adhesive 205 as known in the art. For example, bonding may be performed by a Silicone adhesive, epoxy, solder, braze or other commonly known techniques.

The pressure sensing device 200 includes upper housing 223. Upper housing 223 is configured to provide a sealed attachment to base plate 201. An enclosed volume is defined between upper housing 223 and base plate 201. Flexible corrugated diaphragm 221 serves to divide the enclosed volume into a first volume 219 and a second volume 227. Port 225 is defined through a wall of upper housing 223 and is in communication with a second section or portion of gas or fluid whose pressure P2 is to be measured, and which comes in contact with another side of the pressure sensing device 100. Port 225 may be coupled to a fluid source or gas source which is to be tested for pressure. Pressure sensing die 100 further includes electrical components which create and transmit an electrical signal indicative of a pressure exerted on the die 100. In applications where the fluid being tested is a harsh medium, such as fuel or oil, such media may corrode the electrical components of the die 100. In such embodiments, isolation of the die 100 from the fluid being tested may be accomplished by flexible corrugated diaphragm 221. An oil fill port 215 is provided through the base plate 201. The oil fill port allows the volume 219 between the die 100 and the diaphragm 221 to be filled with a non-corrosive fluid such as silicone oil. When the cavity defining volume 219 is filled, the oil fill port 215 is sealed, for example, by welding a ball 217 across the opening of the oil fill port 215. The oil in volume 219 is thus fully enclosed and in fluid communication with the upper surface of die 100.

Port 225 may be threaded to allow the pressure sensing device 200 to be attached to a line or other transmission means in communication with the gas or fluid to be tested or measured. The gas or fluid being measured enters the port 225 and fills the interior volume 227. When the interior volume 227 is filled, the fluid being measured is in contact with the upper side of the flexible diaphragm 221. Pressure exerted by the gas or fluid being measured is transmitted through the flexible diaphragm 221 to the enclosed volume 219 of oil. The force applied to the oil by the flexible diaphragm 221 is transmitted throughout the oil and to the surfaces containing the oil, including the upper surface of pressure sensing die 100.

When pressures P1 and P2 are exerted on pressure sensing die 100, an electrical signal through piezo-resistive elements formed in the upper surface of the diaphragm of pressure sensing die 100 varies responsive to variations in the piezo-resistive elements. The electrical signal is representative of the differential force applied to the surface of the pressure sensing die 100. The electrical signal is conducted via bond wires 209 to conductive pins 211 which may be electrically connected to other system circuitry, such as a control circuit, or converted to pressure data which may be stored, by way of non-limiting example, in an electronic memory.

The flexible diaphragm 221 and oil filled volume 219 isolate the die 100, bond wires 209 and conductive pins 211 from the corrosive or harsh media being measured via port 225. Additionally, the volume 219 containing the oil must be sealed such that leakage or contamination of the oil within volume 219 does not occur. Conductive pins 211 carrying the electrical signal from the pressure sensing die 100 must pass through the base plate 201 to allow external connection of other system components. Conductive pins 211 are enclosed in a glass or ceramic material fired into a tube or opening 213 which forms a hermetic seal with base plate 201. Hermetic seals are expensive to produce and fragile, but are necessary to ensure the integrity of the volume 219. A pressure sensor which provides isolation of the sensing components and associated circuitry from harsh media being measured in a simple and inexpensive form factor is therefore desired.

Differential pressure sensors may be used in high pressure applications in which the measured Psi in the two different portions are as high or higher than 1000 psi. For example a differential pressure sensor may measure the difference in pressure across an orifice in a high pressure, flowing fluid or gas application. In such an application, the pressure may be 1001 psi on one side of the orifice and the pressure on the other side may be 1000 psi. At high pressures, a differential pressure sensor may exhibit common mode (or line pressure) errors, which may be caused by strain that is unrelated to the pressure, such as thermal expansion which varies between the different materials used in the pressure sensing device 100. While the differential pressure sensors are supposed to only measure the difference in pressure P1 vs. P2, often it is difficult, especially when dealing with high pressure applications, to discern differential pressure from the line pressure or "common mode" pressure. For example, in a situation where there is no differential pressure and no common mode errors, the differential pressure sensor will read zero pressure. However when the pressures P1 and P2 are both 1000 psi, prior art pressure sensors may exhibit common mode error which results in an inaccurate differential pressure of 1 psi.

Methods to eliminate the common mode error are difficult. A novel apparatus and method to eliminate common mode error in differential pressure sensors is therefore desired.

SUMMARY

A differential pressure sensor includes a sensor housing having a base plate with a hole defined therein. A first side of the base plate is configured in fluid communication with a first fluid at a first pressure. A second side of the base plate is configured to be in fluid communication with a second fluid at a second pressure.

A pressure sensing die assembly is attached to the first side of the base plate. The pressure sensing die assembly includes a first pressure sensing die having a diaphragm wherein a first side of the diaphragm is in communication with the first fluid and a second side of the diaphragm is in communication with the second fluid. The diaphragm includes at least one pressure sensitive electrical element that exhibits a varying resistance responsive to deflection of the diaphragm. The pressure sensing die further includes a second pressure sensing die having a diaphragm wherein a first side of the diaphragm is in communication with the first fluid and a second side of the diaphragm is also placed in communication with the first fluid. The diaphragm includes at least one pressure sensitive electrical element that exhibits a varying resistance responsive to deflection of the diaphragm of the second pressure sensing die that is representative of a common mode error of the second pressure sensing die.

DETAILED DESCRIPTION

Figure 1:
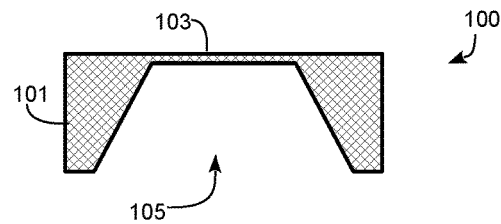
FIG. 1 is a sectional view of a pressure sensor die of the prior art.
Figure 2:
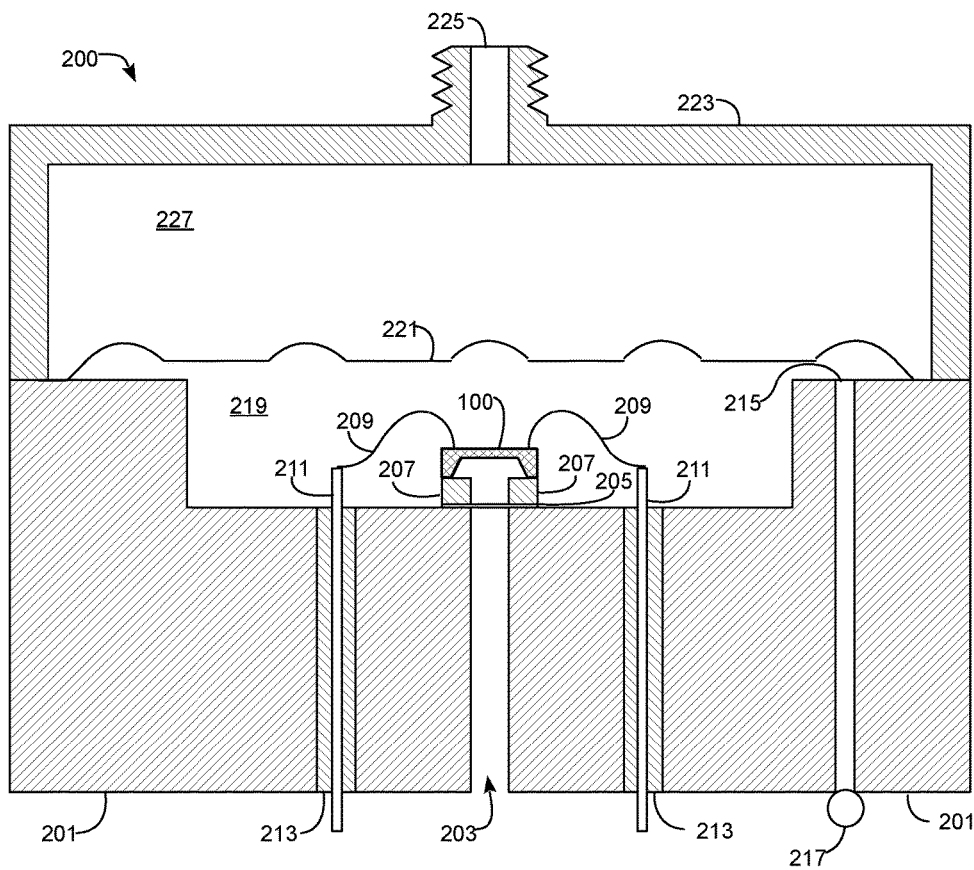
FIG. 2 is a sectional view of an isolated oil filled gauge pressure sensor of the prior art.

It is to be understood that the figures and descriptions of the present invention have been simplified to illustrate elements that are relevant for a clear understanding of the present invention, while eliminating, for purposes of clarity, many other elements found in pressure sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled.

In addition, this description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Measuring the pressure of a fluid is useful for determining and monitoring parameters such as operating pressures of fluids within a system. In some systems, such as in oil extraction or refining operations, it is desirable to monitor the pressure of fluids that are at high pressure, such as at 1000 psi. When measuring high pressures, pressure sensing devices may be subject to error resulting from strain between the different types of materials which are used to create and attach the pressure sensing die to a support structure. Pressure sensors may include a die, generally formed from a piece of semiconductor material. The die includes a relatively thin integral portion that defines a diaphragm. The diaphragm is configured to deflect in response to application of pressure. Piezo-resistive elements are defined on or in the diaphragm. The piezo-resistive elements exhibit electrical resistance which varies in response to strain on the elements. The deflection of the diaphragm in response to pressure applies strain to the piezoresistive elements. Thus, a circuit incorporating the piezo-resistive elements may provide electrical signals that are responsive to the force applied by a fluid against the diaphragm of the die. Suitable calibration and processing components provide output signals indicative of fluid pressure. The pressure measurement indicated by the electrical signal may be provided to other processing components for purposes such as display, control signals, diagnostic purposes or other purposes.

In an embodiment, a configuration may be desired in which the piezo-resistive elements, the connections between them, contact pads, lead lines, and the like are protected from corrosion by harsh media. In such embodiments, the die and piezo-resistive elements may be contained within an enclosed volume filled with a medium, such as an oil, which will not attack the metal components at the die. For example, where a silicon-based die is being used, silicone oil may be used because it will not attack the die. The enclosed volume may be defined in part by an outer diaphragm which is in contact with the fluid to be measured. The outer diaphragm may be formed from a corrosion resistive metal such as stainless steel or titanium, which may contact the harsh media without detriment. The pressure of the fluid being measured exerts force on the outer diaphragm. The outer diaphragm deflects in response to the pressure, and the deflection transmits force to the oil in the enclosed volume. The oil transmits the force to the diaphragm. In this way, the pressure exerted by the fluid being measured is conveyed to the die without the fluid being measured coming in contact with the die or electrical components on the die.

Figure 3A:
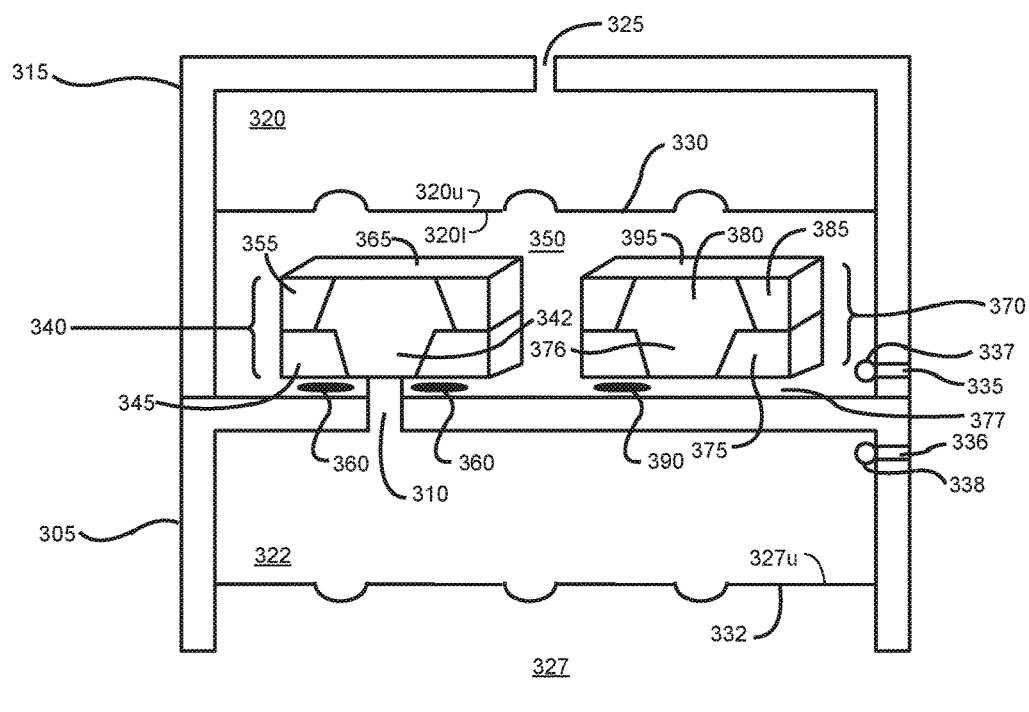
FIG. 3A is a sectional view of an embodiment of a differential pressure common mode compensation die arrangement including two dies.

FIG. 3A is an illustration of a differential MEMS pressure sensor 300 that can output a common mode error corrected differential pressure reading. Pressure sensor 300 includes two separate differential pressure sensing die assemblies, first pressure sensing die assembly 340 and second pressure sensing die assembly 370, the combination of which implements a common mode error corrected differential pressure output. Pressure sensor 300 includes base plate 305, which includes opening 310 defined therethrough. Base plate 305 may be formed from a non-corroding material such as, for example, stainless steel. Hole or opening 310 in the base plate 305 defines an aperture through which a section or portion of gas or fluid whose pressure is being measured is in communication with a lower or underside of pressure sensing die 355. The opening 310 may have a cylindrical cross section, and may be aligned with diaphragm 365. Hole 310 may be configured to have a diameter that corresponds to, or slightly exceeds, a diameter of diaphragm 365.

An upper housing 315 may be attached to base plate 305 and may be configured to provide a sealed attachment to base plate 305. Upper housing 315 and base plate 305 define an enclosed volume 320. The upper housing 315 may also include an opening or hole 325 defined through a wall of upper housing 315, which opening or hole 325 is in fluid communication with another section or portion of gas or fluid whose pressure P1 is to be measured, and which comes in fluid contact with a top or upper side of pressure sensing die assemblies 340 and 370. As used herein, an opening may comprise any sort of void or lack of structure that allows the passage of fluid, including, but not limited to an aperture, a hole, or a port, and including an area which allows the passage or flow of fluid. As used herein, fluid communication includes both direct fluid communication in which a fluid whose pressure is being measured makes direct contact with a diaphragm, or indirect fluid communication in which a fluid whose pressure is being measured makes indirect contact with a diaphragm through another medium, such as through a flexible diaphragm and silicon oil. Although the fluid communication is indirect, the pressure of the fluid is nevertheless communicated to the diaphragm which measures the pressure.

In an embodiment, the enclosed volume 320 may include a flexible corrugated diaphragm 330, which may serve to divide the enclosed volume 320 into a first volume 320*u* and 320*l*. As will understood, pressure sensing dies such as die assemblies 340 and 370 may include electrical components which create and transmit an electrical signal indicative of a pressure exerted on the dies. In applications where the fluid being tested is a harsh medium, such as fuel or oil, such media may corrode the electrical components of the dies if they make contact with the dies. Therefore, in an embodiment the die may be isolated from the fluid being tested, which may be accomplished by use of a flexible corrugated diaphragm 330. In implementations with a corrugated diaphragm, the base plate 305 may include an oil fill port 335. The oil fill port allows the volume 3201 between the base plate 305 and the diaphragm 330 to be filled with a non-corrosive fluid such as silicone oil. When the cavity defining volume 3201 is filled, the oil fill port 335 is sealed, for example, by welding a ball 337 across the opening of the oil fill port 335. The oil in volume 3201 is thus fully enclosed and in fluid communication with the upper surface of die assemblies 340 and 370, and also with the lower surface of die 370, as explained herein. Port or aperture 310 may similarly include a flexible corrugated diaphragm 332, which defines a volume 322 in which oil may be installed to isolate diaphragm 365 from being exposed to potentially corrosive fluids being measured from volume 327. The cavity defining volume 322 may be filled with oil, and then the oil fill port 336 sealed, for example, by welding a ball 338 across the opening of the oil fill port 336. In applications in which the pressure sensing device will be used with fluids which are non-corrosive to the die, it may not be necessary to use flexible diaphragms and oil to isolate the die assemblies from the fluid.

In an embodiment, port 325 may be threaded to allow the pressure sensing device 200 to be attached to a line or other transmission means in communication with the gas or fluid to be tested or measured. The gas or fluid being measured enters the port 325 and fills the interior volume 320. When the interior volume 320 is filled, the fluid being measured is in contact with the upper side of the flexible diaphragm 330. Pressure exerted by the gas or fluid being measured is transmitted through the flexible diaphragm 330 to the enclosed volume 320 of oil. The force applied to the oil by the flexible diaphragm 330 is transmitted throughout the oil and to the surfaces containing the oil, including the upper surface of pressure sensing die assemblies 340 and 370 including diaphragms 365 and 395, and also with the lower surface of diaphragm 395. Although the fluid being measured contacts the diaphragm and does not contact the pressure sensing dies, the fluid is nevertheless considered to be in fluid communication with the pressure sensing dies because the pressure of the fluid is indirectly communicated to the dies by the flexible diaphragm 330 and the oil in volume 320.

Pressure sensing die assemblies 340 and 370 may each include several parts. Typically, each pressure assembly may include a support structure which is attached to the base plate 305, and a die including a diaphragm that is attached to the support structure, and at least one pressure sensitive electrical element in or on the diaphragm which is configured to exhibit a varying resistance responsive to deflection of the diaphragm. The support structure for a die may also be referred to as a "constraint." One or more electrical conductors may be connected to the diaphragm so that the resistance change of the electrical element can be observed by the system monitoring the pressure. In the embodiment of FIG. 3A, the die assemblies perform different functions—die assembly 340 is configured to measure the differential pressure between P1 and P2, and die assembly 370 is configured to measure the common mode error experienced by die 370. In an embodiment, die assembly 370 is constructed substantially similarly to die assembly 340 in size, support structure, and die materials, shape, and mounting materials, so that die assembly 370 experiences common mode error substantially similar or identical to the common mode error experienced by die assembly 340.

As noted, first pressure sensing die assembly 340 is configured to measure the differential pressure between P1 and P2. Die assembly 340 may include a first support structure 345 which includes aperture 342, which permits fluid communication between the fluid in hole 310, chamber 350, and the lower side of diaphragm 365. First pressure sensing die 355 may be mounted to the support structure 345. The support structure 345 is bonded to the base plate 305 (which may also be termed a header) by an adhesive 360. The support structure 345 may be used to isolate the pressure sensing die 355 from sources of strain that are unrelated to pressure, such as thermal expansion that would occur between the pressure sensing die 355 and the base plate 305. An aperture or hole 310 is defined in the base plate 305 which is in gas or fluid communication with the underside of the diaphragm 365 of pressure sensing die 355 through support structure aperture 342. The hole 310 is in communication with a section or portion of the fluid whose pressure P2 is to be measured and which comes in contact with an underside of diaphragm 365. The pressure sensing die 355 and the support structure 345 are preferably positioned over the hole 310 in base plate 305 such that the flow of fluid from hole 310 is not obstructed. Support structure 345 may be formed from glass or similar material which has a coefficient of thermal expansion closer to that of the silicon pressure sensing die 355 as compared to the coefficient of thermal expansion of the stainless steel making up the base plate 305. This matching of the coefficients of thermal expansion help reduce or prevent strain on the pressure sensing die 355 related to dissimilar rates of expansion between the die material and the base plate material. For example, the support structure may be formed from silicon, or other materials, such as glass or PYREX, which are chemically inert and can be bonded to the silicon of a semiconductor die.

The support structure 345 may be bonded or attached to the base plate 305 by an appropriate adhesive 360 as known in the art, and may be impervious to fluid. For example, bonding may be performed by a Silicone adhesive, epoxy, solder, braze or other commonly known techniques.

Figure 3B:
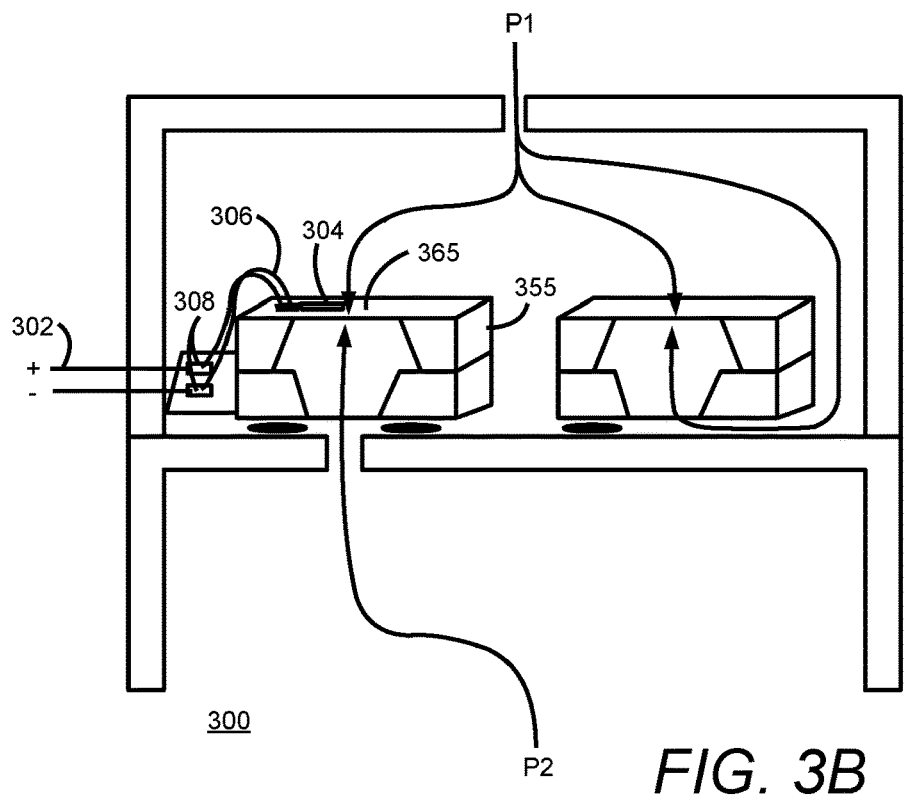
FIG. 3B is a sectional view of an embodiment of a differential pressure common mode compensation die arrangement including two dies, which depicts the interaction of the pressures being measured, with the dies.

The diaphragm 365 of pressure sensing die 355 may have pressure sensitive electrical elements, such as piezo-resistive resistor elements, in or on the diaphragm 365. The elements may be strategically placed in strain fields of the diaphragm. When force P2 is exerted on the underside of diaphragm 365 and force P1 is exerted on the top or upper side of diaphragm 365, the upper surface of the diaphragm of pressure sensing die 100 varies responsive to variations in the piezo-resistive elements. FIG. 3B shows with reference to FIG. 3A, how pressures P1 and P2 interact with the diaphragm 365. An electrical signal 302 applied to the piezo-resistive elements 304 will reflect the varied response of the elements 304, and will be representative of the differential force applied to the surface of the diaphragm 365 of pressure sensing die 355. An electrical signal 302 may be applied to the piezo-resistive elements 304 via one or more electrical conductors such as bond wires 306 or electrical conductive traces 308 or other electrical connections to the piezo-resistive elements 304 of diaphragm 365. As will be understood, the bond wire 306 may be directly or indirectly connected (such as by electrical conductive traces 308) to other system circuitry, such as a control circuit, or converted to pressure data which may be stored, by way of non-limiting example, in an electronic memory.

Referring again to FIG. 3A, as noted, second pressure sensing die assembly 370 is configured to measure the common mode error experienced by the die assembly 370.

At high pressures, a differential pressure sensor may exhibit common mode errors, which may be caused by strain that is unrelated to the pressure, such as thermal expansion which varies between the different materials used in the pressure sensing device. Die assembly 370 may include a second support structure 375 which may include second aperture 376, which permits fluid communication between the portion of the fluid entering opening 325 and chamber 380 of the pressure sensing die 385. FIG. 3B shows how pressures P1 and P2 interact with the diaphragm 395 of die assembly 370. Second pressure sensing die 385 may be mounted to the support structure 375. The support structure 375 is bonded to the base plate 305 by an adhesive 390. In an embodiment, adhesive 390 may be applied such that it forms a vent channel 377 between chamber 380 and the exterior of the die assembly 370, which places the chamber 380 in fluid communication with pressure P1.

Figure 3C:
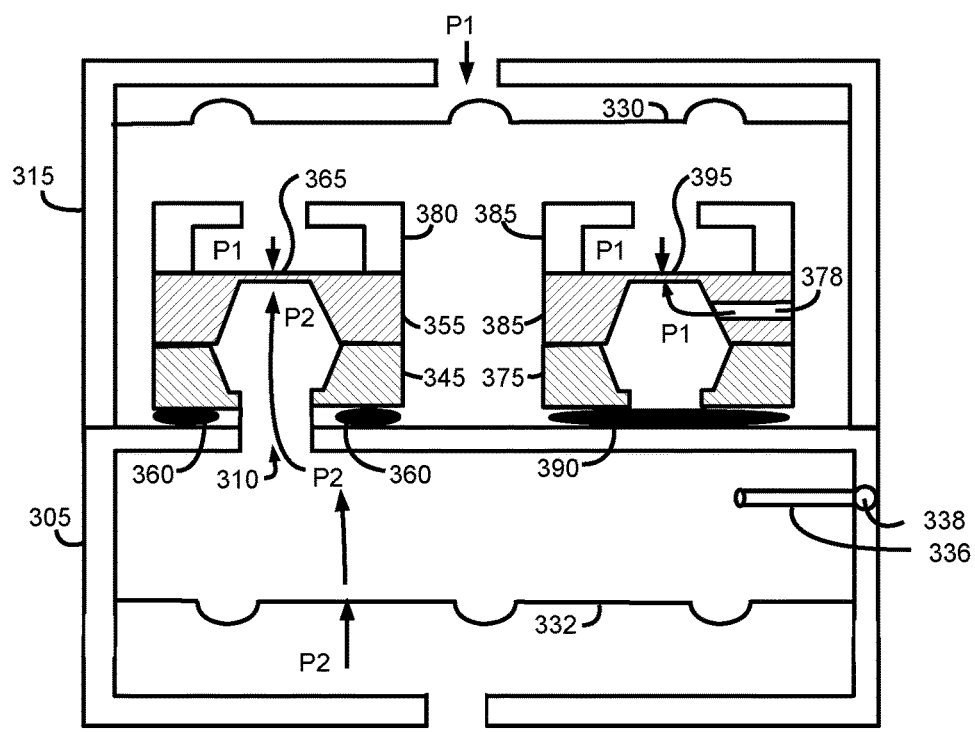
FIG. 3C is a sectional view of an embodiment of a differential pressure common mode compensation die arrangement including an integral vent channel defined in one of the dies.

Referring to FIG. 3C, another embodiment is shown in which, the vent channel 378 is effected by an integral vent in the die 385 that places the chamber 380 in fluid communication with pressure P1. Alternatively, an integral vent may be defined in the support structure 375 In the embodiment of FIG. 3C, the support structure 375 may be bonded to the base plate 305 by an adhesive 390 without forming a vent channel using the adhesive. The support structure 375 may be used to isolate the pressure sensing die 385 from sources of strain that are unrelated to pressure, such as thermal expansion that would occur between the pressure sensing die 385 and the base plate 305. Because die assembly 370 is configured to measure the common mode error of pressure P1, the pressure sensing die 385 and the support structure 375 are positioned away from, and isolated from, hole 310 in base plate 305, and the adhesive 360 used to bond support structure 345 of die assembly 340 is sealed to prevent pressure P2 from being in fluid communication with die assembly 370.

Referring again to FIG. 3A, support structure 375 may be formed from glass or similar material which has a coefficient of thermal expansion closer to that of the silicon pressure sensing die 385 as compared to the coefficient of thermal expansion of the stainless steel making up the base plate 305. This matching of the coefficients of thermal expansion help reduce or prevent strain on the pressure sensing die 385 related to dissimilar rates of expansion between the die material and the base plate material. For example, the support structure may be formed from silicon, or other materials, such as glass or PYREX, which are chemically inert and can be bonded to the silicon of a semiconductor die. The support structure 375 may be bonded or attached to the base plate 305 by an appropriate adhesive 390 as known in the art. For example, bonding may be performed by a Silicone adhesive, epoxy, solder, braze or other commonly known techniques. As noted, in an embodiment adhesive 390 may be applied such that it forms a vent channel 377 between the base plate 305 and support structure 375, which places the chamber 380 in fluid communication with support structure aperture 376, vent channel 377, and pressure P1 on the exterior of die assembly 370.

Figure 4:
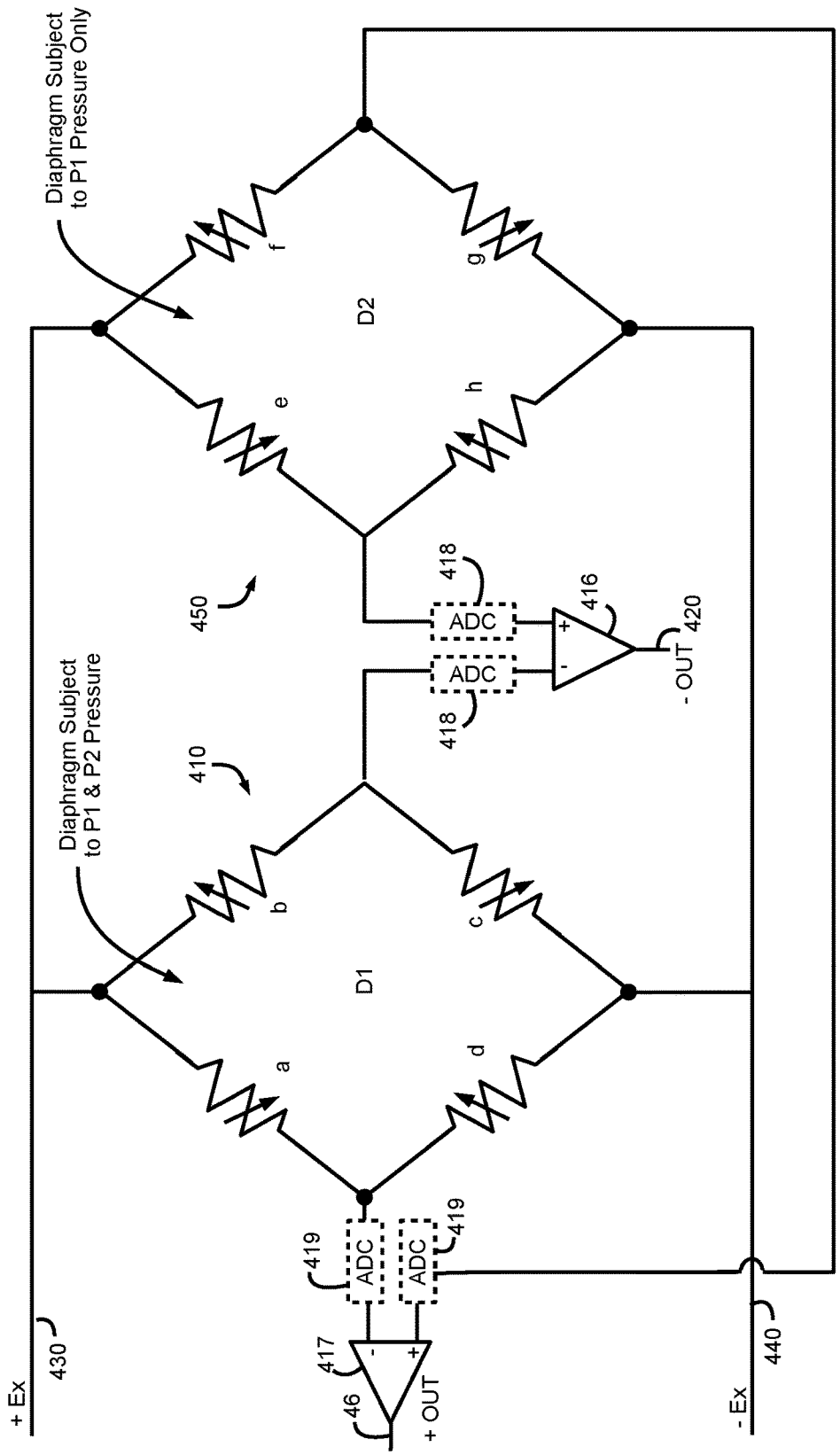
FIG. 4 is a circuit diagram of parallel connected bridge circuits on the diaphragms of the embodiments of FIGS. 3A and 5A.

The diaphragm 395 of pressure sensing die 385 may have pressure sensitive electrical elements, such as piezo-resistive resistor elements, in or on the diaphragm 395. The elements may be strategically placed in strain fields of the diaphragm. When force P1 is exerted on the underside of diaphragm 365 and force P1 is exerted on the top or upper side of diaphragm 365, the upper surface of the diaphragm of pressure sensing die 100 varies responsive to variations in the piezo-resistive elements. An electrical signal applied to the piezo-resistive elements will reflect the varied response of the elements, and will be representative of the common mode error experienced by pressure sensing die 385. An electrical signal may be applied to the piezo-resistive elements via one or more electrical conductors such as bond wires or conductive traces (not shown) or other electrical connections to the piezo-resistive elements of diaphragm 395. As will be understood, the bond wire may be directly or indirectly connected to other system circuitry, such as a control circuit, or converted to pressure data which may be stored, by way of non-limiting example, in an electronic memory. Dies 355 and 385 may be semiconductor dies which have a solid body having a first region with a first, substantially uniform, thickness and a second region having a second, also substantially uniform, thickness which is less that the first thickness. The second region defines the integral diaphragms of the each die, and has a thickness substantially less that the thickness of the surrounding areas of semiconductor die. The diaphragm is an integral part of a semiconductor die such as dies 355 and 385. The area below the diaphragm is a chamber that is closed at one end by the corresponding diaphragm and open at an opposite end to an aperture or chamber of the support structure to which the die is mounted. The chamber of the diaphragm may define a continuous side wall interior of the die. FIG. 4 depicts a schematic 400 of two parallel connected bridge circuits D1 (410) and D2 (450) which may be defined in or on diaphragms 365 and 395 (shown in FIG. 3A). Bridge circuit D1 (410) corresponds to a circuit defined in or on diaphragm 365 of die assembly 340, and includes piezo-resistive elements in a bridge pattern, which elements comprise variable resistors whose resistances vary with the flexing of the diaphragm 365. Bridge circuit D2 (450) corresponds to a circuit defined in or on diaphragm 395 of die assembly 370, and includes piezo-resistive elements in a bridge pattern, which elements comprise variable resistors whose resistances vary with the flexing of the diaphragm 395. As shown in FIG. 4, bridge circuits D1 and D2 may each have an excitation voltage Ex+(430) and Ex− (440) applied to them, which may be effected by a suitable electrical connection such as suitable electrical conductors connected to the bridge circuits. In the embodiment shown in FIG. 4, bridge circuits D1 and D2 are electrically connected by connector 420, which may also be effected by a suitable electrical connection such as an electrical conductor between the bridge circuits.

In particular, the electrical connector 420 is configured to connect the common mode error output of D2 to the output of the differential pressure sensed by D1 so that the output at Out+ (46) and Out− (420) is the common mode error corrected differential pressure measured by the combination of the bridge circuits. The piezo-resistive elements and conductive traces may be formed by differentially diffusing one or more dopants within the semiconductor material of the die to define the piezo-resistive elements and conductive circuit elements, using techniques and materials well known in the art. The conductive circuit elements may be representative of a conductive path in the semiconductor material to complete circuits including the piezo-resistive elements, and may also include contact pads for connecting external conductors to the circuit. In an embodiment, the negative output terminal of a pressure sensitive electrical element of the first diaphragm may be connected to the positive output terminal of a pressure sensitive electrical element of the second diaphragm by a bonding wire or a conductive trace on or in the pressure sensing die.

The outputs of the two bridges 410, 450 may be summed using a summing amplifier 216, 217. Summing amplifier 216, 217 may be analog summing amplifiers or in an embodiment, may be implemented as digital summing amplifiers. When optionally implemented as digital summing amplifiers, the outputs 46, 420 of bridge circuits 410, 450 are input to analog to digital converters (ADC) 418, 419. The outputs are digitized and then summed by digital summing amplifiers 416, 417. In an embodiment, the ADCs 418, 419 may be omitted and analog summing amplifiers 416, 417 may be used. Accordingly, common mode correction may be performed in analog or digitally. A digital architecture requiring additional components and increased complexity.

Figure 4A:
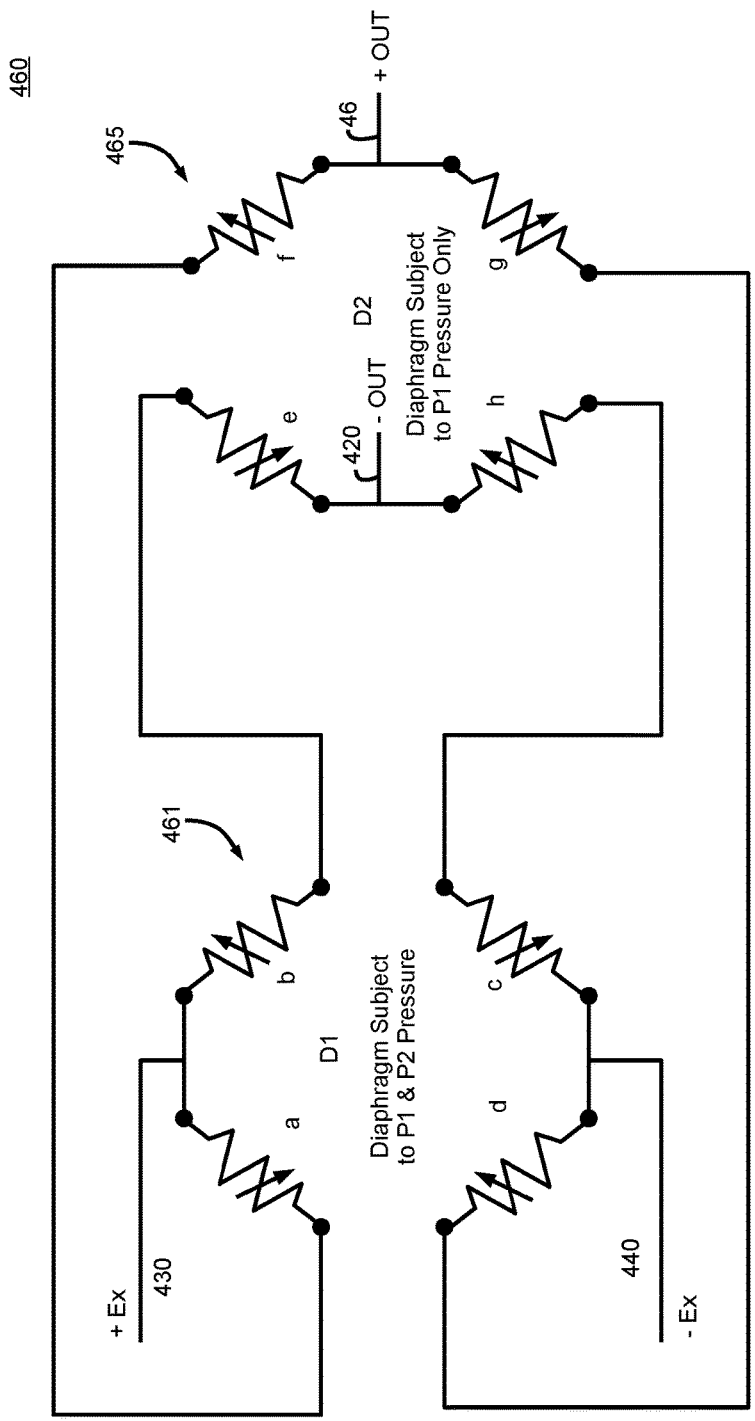
FIG. 4A is a circuit diagram of series connected bridge circuits on the diaphragms of the embodiments of FIGS. 3A and 5A.
Figure 4B:
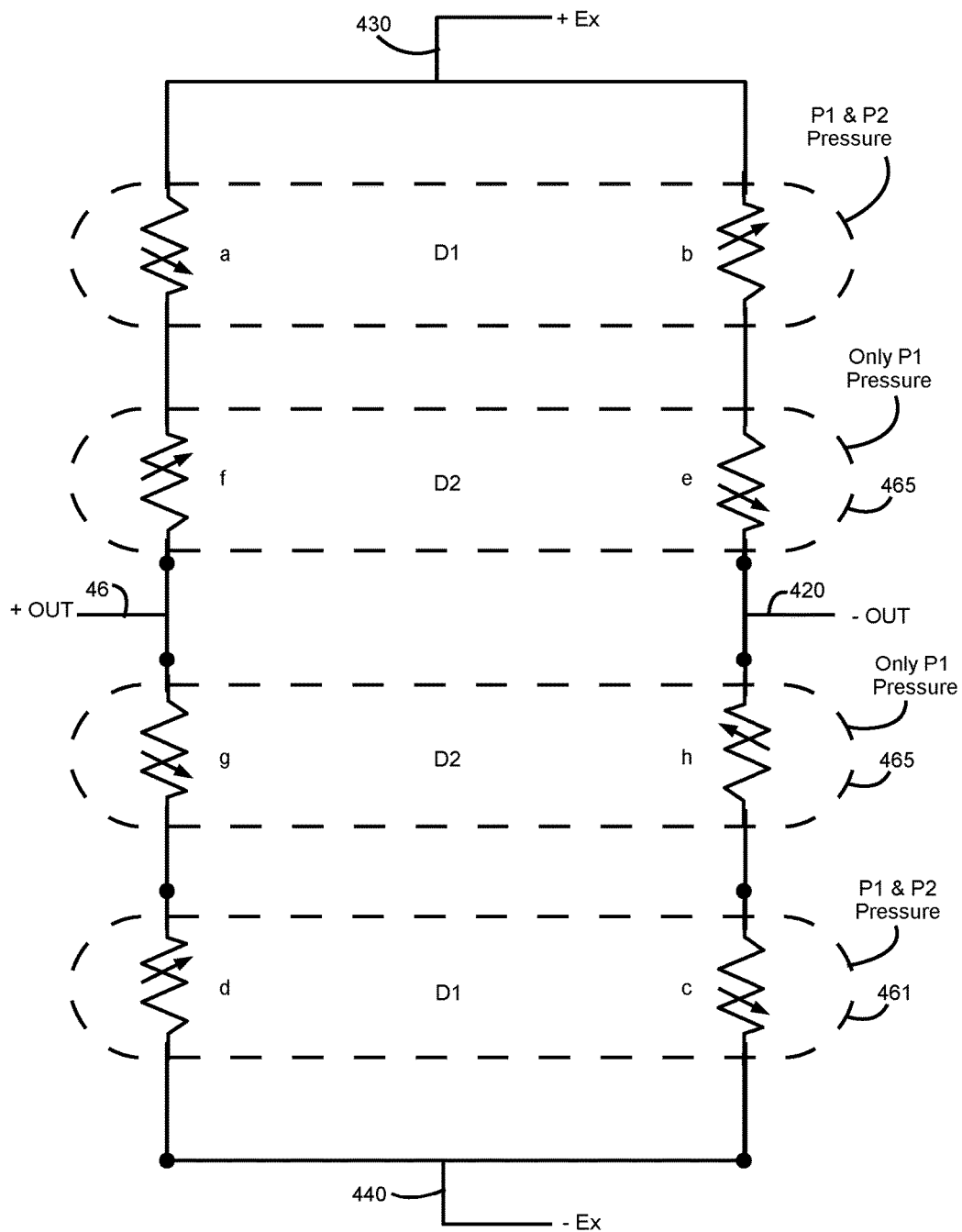
FIG. 4B is a functional schematic of the series connected bridge circuits of FIG. 4A.

FIG. 4A depicts a schematic 400 of an arrangement in which, similar to FIG. 4, four variable resistors are provided on each of a first diaphragm arranged to receive differential pressure and a second diaphragm arranged to receive pressure from a same source on both sides. In this arrangement, on each diaphragm, two pairs of resistors are connected to one another, and each pair is connected in series to the two pairs of resistors defined on the other of the two diaphragms. Otherwise stated, strain sensitive resistors are arranged in a full open bridge arrangement on each diaphragm. Reference voltages are provided at nodes within pairs of resistors on the first diaphragm, and outputs are provided at nodes within pairs of resistors on the second diaphragm. Referring particularly to FIG. 4A, variable resistors a and b are connected to define a first pair of resistors on diaphragm D1. Variable resistors c and d are connected to define a second pair of resistors on diaphragm D1. Variable resistors e and h are connected to define a first pair of resistors on diaphragm D2. Variable resistors f and g are connected to define a second pair of resistors on diaphragm D2. Resistor pair a/b on diaphragm D1 is connected in series to resistor pair e/h and to resistor pair f/g on diaphragm D2. Similarly, resistor pair c/d on diaphragm D1 is connected in series to resistor pair e/h on diaphragm D2 and to resistor pair f/g on diaphragm D2 Diaphragm D1 is arranged to detect differential pressure, similarly to die 355 of die assembly 340. Diaphragm D2, which may be arranged as diaphragm 395 of die assembly 370, to detect common mode pressure. Positive excitation voltage Ex+ 430 is applied at a node between resistors a and b on diaphragm D1. Negative excitation voltage Ex− 440 is applied at a node between resistors c and d on diaphragm D1. These voltages may be effected by a suitable electrical connection such as suitable electrical conductors connected to the bridge circuits. Positive output 46 is provided at a node between resistor f and resistor g on diaphragm D2. Negative output −OUT 420 is provided at a node between piezoresistor "e" and piezoresistor "h" on diaphragm D2. Connections for outputs may be effected by a suitable electrical connection such as an electrical conductor between the piezoresistors. When the excitation voltages are applied between resistor pairs on diaphragm D1, the output signals are effectively corrected for common mode errors. As compared to the arrangement of FIG. 4, the impedance is greater, as a result of the resistors being connected in series instead of being connected in parallel as shown in FIG. 4. As a result of the greater impedance, overall power consumption. These series and parallel designs may have the power reversed and will work equivalently with the outputs reversed as well. Similarly, the power may be input to the output leads as shown and the input leads would produce a comparable output. FIG. 4B shows a high level functional schematic of the circuit of series bridge circuits of FIG. 4A. For ease of illustration, each diaphragm D1, D2 is shown twice.

Figure 4C:
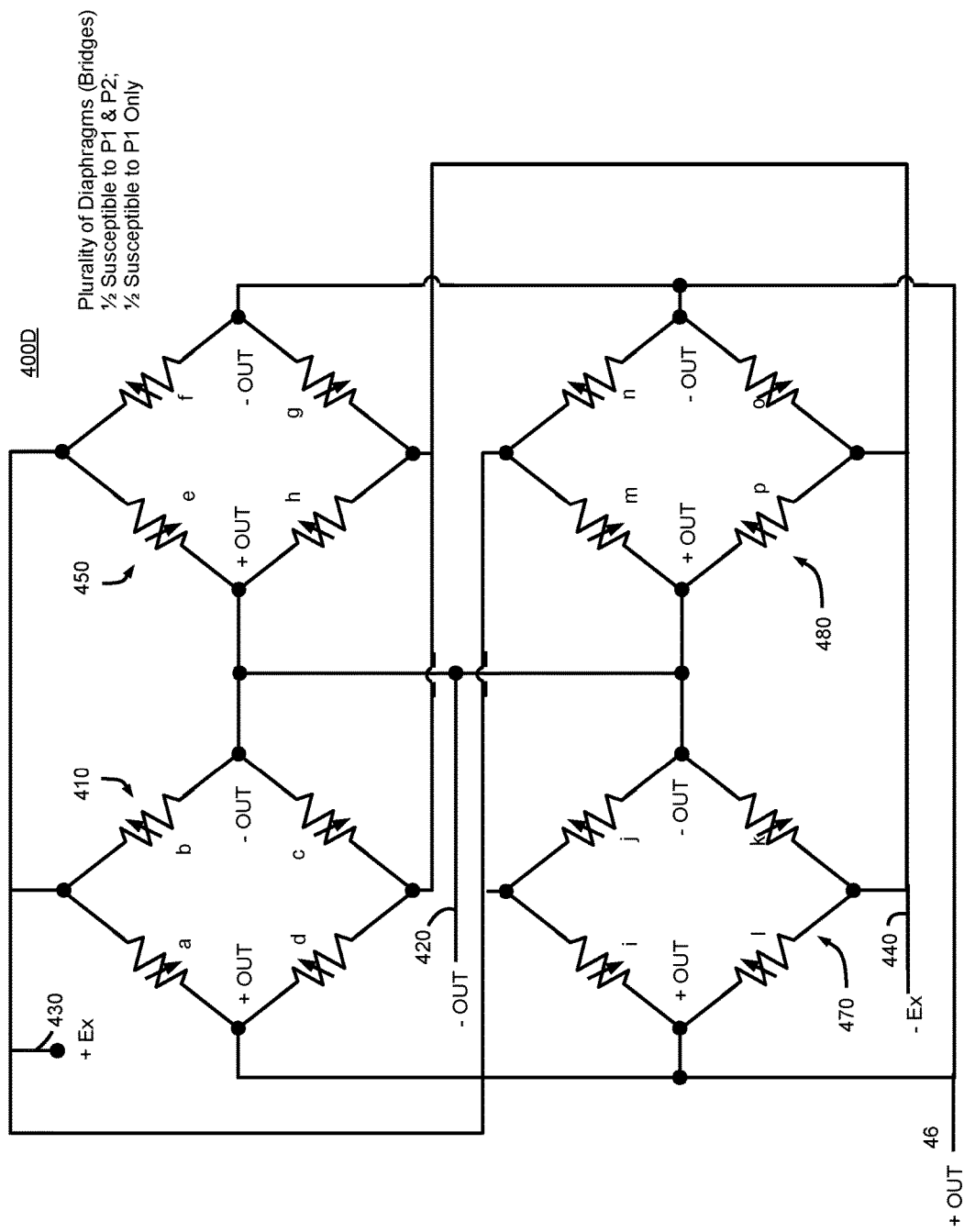
FIG. 4C is a circuit diagram of a plurality of bridge circuits on a plurality of diaphragms according to an embodiment of the invention.

Referring now to FIG. 4C, an embodiment of a differential pressure sensor according to an embodiment of the invention, which utilizes a plurality of diaphragms susceptible to differential pressure, and the same number of diaphragms susceptible to common pressure. In FIG. 4C, two of each type of diaphragm are shown; however, more diaphragms may be provided.

While the embodiment illustrated in FIG. 4C shows four bridge circuits, 410, 450, 470 and 480, corresponding to four diaphragms, or two pairs of diaphragms, additional diaphragms may be added in pairs having corresponding bridge circuits. Common mode errors may be corrected by configuring the sensor 400D such that half of the diaphragms are subjected to differential pressure between pressure P1 and P2 (as shown in FIG. 3A), and the remaining diaphragms are subjected only to pressure P1. Each bridge circuit is arranged in a closed full bridge arrangement, with each of four resistors connected in series. A positive excitation voltage +Ex 430 is applied to each bridge circuit. +Ex is applied to bridge 410 at a node between piezo resistor "a" and piezoresistor "b", to bridge circuit 450 at a node between piezoresistor "e" and piezoresistor "f", to bridge circuit 470 at a node between piezoresistor "i" and piezoresistor "j", and to bridge 480 at a node between piezoresistor "m" and piezoresistor "n". A negative excitation voltage −Ex 440 is applied to each bridge circuit at a node opposite the nodes at which positive excitation voltage +Ex 430 is applied. Negative excitation voltage −Ex 440 is applied to bridge 410 between piezoresistor "c" and piezoresistor "d", to bridge 450 between piezoresistor "g" and piezoresistor "h", to bridge 470 between piezoresistor "k" and piezoresistor "l", and to bridge 480 between piezoresistor "o" and piezoresistor "p".

The negative output −OUT 420 is connected at a node is positioned between piezoresistor "b" and piezoresistor "c" of bridge 410, piezoresistor "e" and piezoresistor "h" of bridge 450, piezoresistor "j" and piezoresistor "k" of bridge 470 and piezoresistor "m" and piezoresistor "p" of bridge 480. The positive output +OUT is commonly connected to each bridge circuit. +OUT 46 is positioned between piezoresistor "a" and piezoresistor "d" of bridge 410, piezoresistor "f" and piezoresistor "g" of bridge 450, piezoresistor "i" and piezoresistor "l" of bridge 470 and piezoresistor "n" and piezoresistor "o" of bridge 480.

Figure 4D:
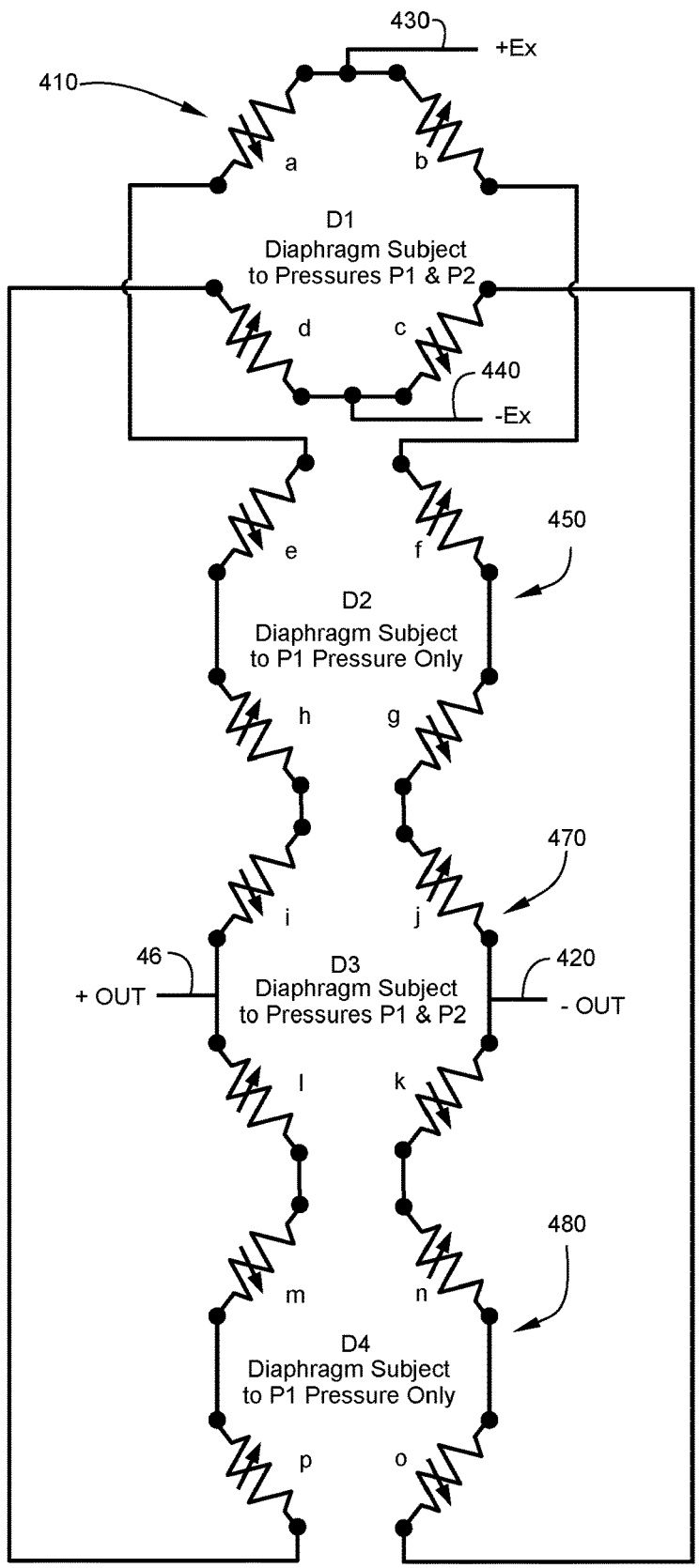
FIG. 4D is a circuit diagram of a plurality of bridge circuits connected in series on a plurality of diaphragms according to an embodiment of the invention.
Figure 4E:
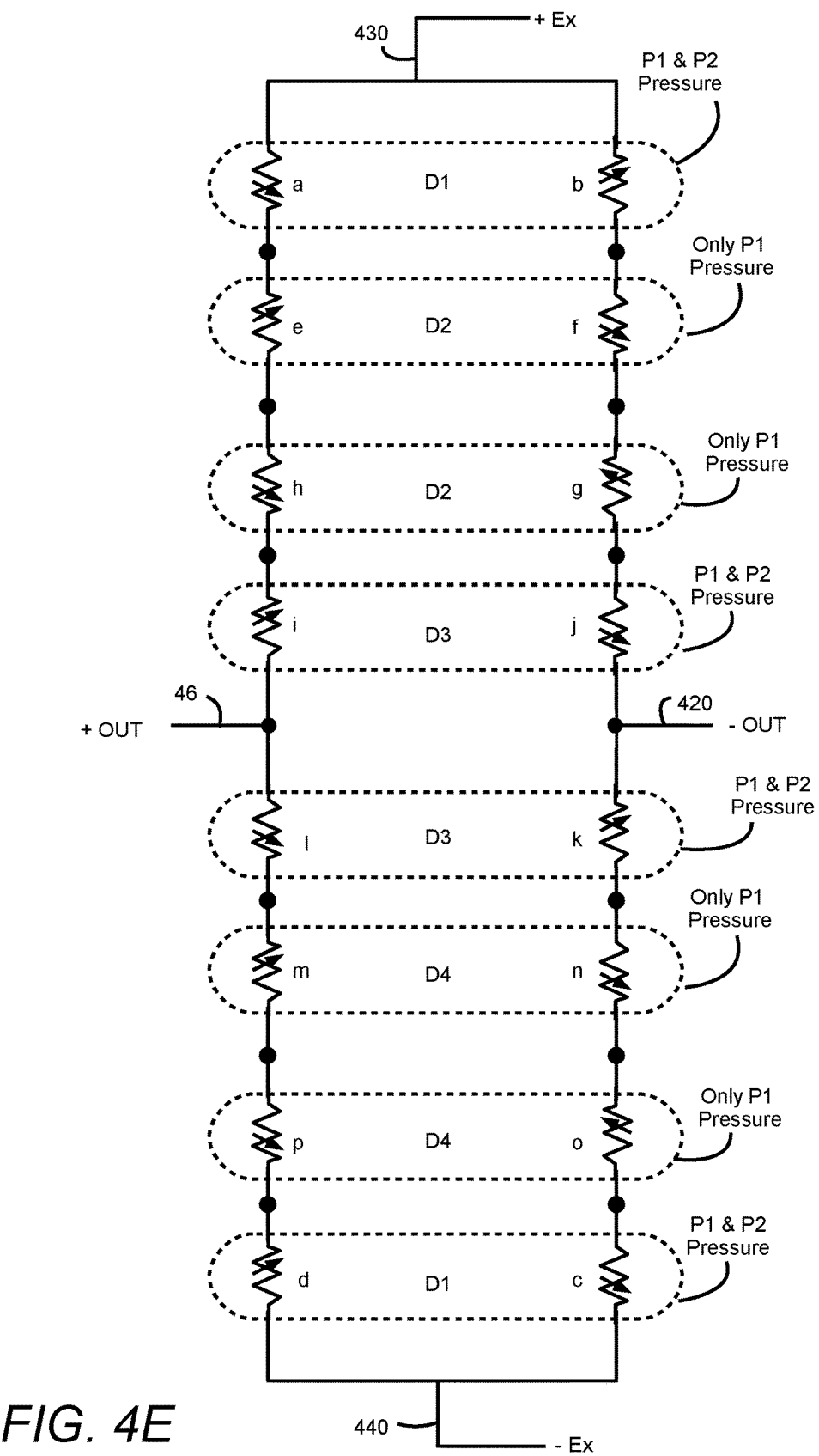
FIG. 4E is a functional schematic drawings of an embodiment having a plurality of series connected bridge circuits.

FIG. 4D depicts a schematic of an arrangement in which, similar to FIG. 4, sixteen variable resistors are provided in groups of four on each of a plurality of diaphragms D1, D2, D3, D4. While four diaphragms are illustrated in FIG. 4D, more or fewer diaphragms may be used. Half of the diaphragms are arranged to receive differential pressure and the other half of the plurality of diaphragms are arranged to receive pressure from a same source on both sides. In this arrangement, on each diaphragm, two pairs of resistors are connected to one another, and each pair is connected in series to the two pairs of resistors defined on the other diaphragms. Otherwise stated, strain sensitive resistors are arranged in a full open bridge arrangement on each diaphragm. Reference voltages 430, 440 are provided at nodes within pairs of resistors on the first diaphragm 410, and outputs 46, 420 are provided at nodes within pairs of resistors on diaphragm D3 470. Referring particularly to FIG. 4D, variable resistors a and b are connected to define a first pair of resistors on diaphragm D1 410. Variable resistors c and d are connected to define a second pair of resistors on diaphragm D1 410. Variable resistors e and h are connected to define a first pair of resistors on diaphragm D2 450. Variable resistors f and g are connected to define a second pair of resistors on diaphragm D2 450. Resistor pair a/b on diaphragm D1 410 is connected in series to resistor pair e/h and to resistor pair f/g on diaphragm D2 450. Similarly, resistor pair c/d on diaphragm D1 410 is connected in series to resistor pair m/p on diaphragm D4 480 and to resistor pair n/o on diaphragm D4 480 Diaphragms D1 410 and D3 470 are arranged to detect differential pressure, similarly to die 355 of die assembly 340. Diaphragms D2 450 and D4 480, which may be arranged as one or more diaphragms 395 of die assembly 370, to detect common mode pressure. Positive excitation voltage Ex+ 430 is applied at a node between resistors a and b on diaphragm D1. Negative excitation voltage Ex– 440 is applied at a node between resistors c and d on diaphragm D1. These voltages may be effected by a suitable electrical connection such as suitable electrical conductors connected to the bridge circuits. Positive output 46 is provided at a node between resistor i and resistor I on diaphragm D3 470. Negative output –OUT 420 is provided at a node between piezoresistor "j" and piezoresistor "k" on diaphragm D3 470. Connections for outputs may be effected by a suitable electrical connection such as an electrical conductor between the piezoresistors. When the excitation voltages are applied between resistor pairs on diaphragm D1 410, the output signals are effectively corrected for common mode errors. As compared to the arrangement of FIG. 4C, the impedance is greater, as a result of the greater impedance, overall power consumption increases. FIG. 4E shows a high level functional schematic of the circuit of series bridge circuits of FIG. 4D. For ease of illustration, each diaphragm D1, D2, D3, D4 is shown twice.

FIG. 4E is a high level functional diagram of a series connected common mode error compensated sensor circuit, utilizing a plurality of full open bridge circuits arranged on four diaphragms D1, D2, D3 and D4, and connected in series similarly to the circuit shown in FIG. 4A. Excitation voltage +Ex 430 is applied at a node between piezoresistor "a" and piezoresistor "b" of a first bridge circuit on diaphragm D1 which is exposed to the differential pressure of pressure P1 and pressure P2. Piezoresistor "a" is connected in series to piezoresistors "e" and "h" of a first bridge circuit on diaphragm D2 which is only exposed to pressure P1. Piezo resistor "h" is coupled to piezoresistor "i" of a second bridge circuit on diaphragm D3 which is exposed to pressure P1 and pressure P2. Piezoresistor "i" is connected to piezoresistor "l" on diaphragm D3, and positive output 46 +OUT is at a node between piezoresistors "i" and T. Piezoresistor "l" is connected to piezoresistor "m" which is part of a bridge defined by "m" and "p" on diaphragm D4 which is only exposed to pressure P1. Piezoresistor "p" is connected to piezoresistor "d" on diaphragm D1 which is exposed to the differential pressure between pressure P1 and pressure P2. Negative excitation voltage –Ex 440 is connected at a node between resistors "c" and "d".

Piezoresistor "b" is connected in series to piezoresistors "f" and "g" on diaphragm D2 of a first bridge circuit which is only exposed to pressure P1. Piezo resistor "g" is coupled to piezoresistor "j" of a second bridge circuit on diaphragm D3 which is exposed to pressure P1 and pressure P2. Piezoresistor "j" is connected to piezoresistor "k" A node between "j" and "k" is provided for –OUT output 420. Piezoresistor "k" is connected to piezoresistors "n" and "o" on diaphragm D4 which is only exposed to pressure P1. Piezoresistor "o" is connected to piezoresistor "c" of the first bridge circuit on diaphragm D1 which is exposed to the differential pressure between pressure P1 and pressure P2.

Figure 5A:
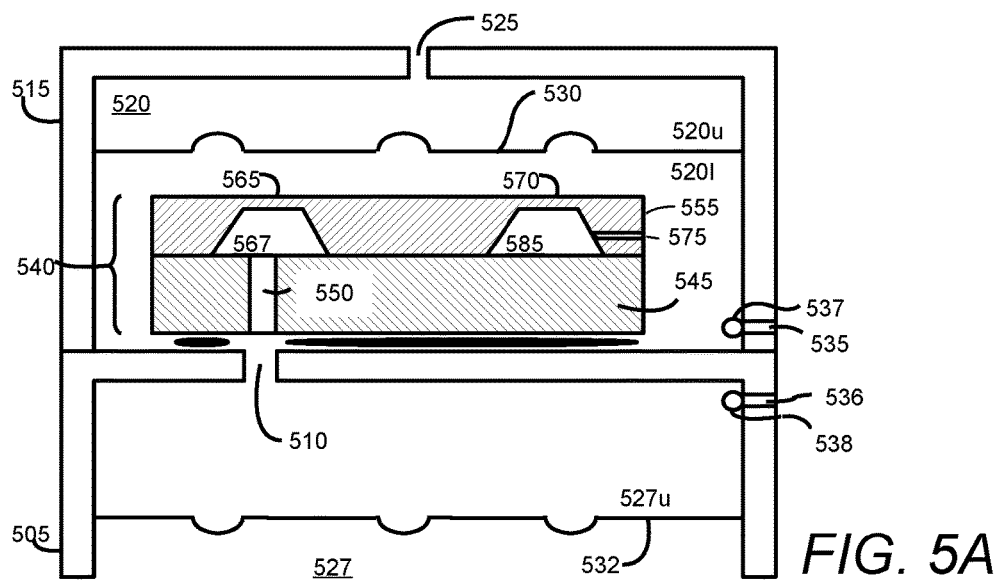
FIG. 5A is a sectional view of an embodiment of a differential pressure common mode compensation die arrangement including a single die with two diaphragms.

FIG. 5A depicts a common mode error compensated pressure sensor system 500 which can output a common mode error corrected differential pressure reading. The embodiment of FIG. 5A includes a single pressure sensing die assembly 540 having a single pressure sensing die 555 having two diaphragms, one of the diaphragms 565 measuring the differential pressure between two portions of a fluid and the other of the diaphragms 570 measuring the common mode error inherent in the sensing die assembly. Pressure sensor 500 includes base plate 505, which includes hole (or port or aperture or opening) 510 defined therethrough. Base plate 505 may be formed from a non-corroding material such as, for example, stainless steel. Hole or opening 510 in the base plate 505 defines an aperture through which a section or portion of gas or fluid whose pressure is being measured is in communication with a lower or under side of diaphragm 565. An upper housing 515 is attached to base plate 505 and is configured to provide a sealed attachment to base plate 505. Upper housing 515 and base plate 505 define an enclosed volume 520. The upper housing 515 may also include a port or hole 525 defined through a wall of upper housing 515, which hole 525 is in fluid communication with another section or portion of gas or fluid whose pressure is to be measured, and which comes in fluid contact with a top or upper side of diaphragms 565 and 570.

In an embodiment, the enclosed volume 520 may include a flexible corrugated diaphragm 530, which may serve to divide the enclosed volume 520 into a first volume 520u and 520l. As will understood, pressure sensing dies such as die assembly 540 typically includes electrical components which create and transmit an electrical signal indicative of a pressure exerted on the dies. In applications where the fluid being tested is a harsh medium, such as fuel or oil, it may be desired to isolate the die from the fluid being tested, which may be accomplished by use of a flexible corrugated diaphragm 530. In implementations with a corrugated diaphragm, the base plate 505 may include an oil fill port 535. The oil fill port allows the volume 520l between the base plate 505 and the diaphragm 530 to be filled with a non-corrosive fluid such as silicone oil. When the cavity defining volume 520l is filled, the oil fill port 535 is sealed, for example, by welding a ball 537 across the opening of the oil fill port 535. The oil in volume 520l is thus fully enclosed and in fluid communication with the upper surface of die assembly 540, and also with the lower surface of die 555, as explained herein. Port or aperture 510 may similarly include a flexible corrugated diaphragm 532, which defines a volume 527u in which oil may be installed to isolate diaphragm 565 from being exposed to potentially corrosive fluids in volume 527, which contains or includes the fluid whose pressure is being measured. The cavity defining volume 527u may be filled with oil, and then the oil fill port 536 sealed, for example, by welding a ball 538 across the opening of the oil fill port 536. In applications in which the pressure sensing device will be used with fluids which are non-corrosive to the die, it may not be necessary to use flexible diaphragms and oil to isolate the die assemblies from the fluid.

Port 525 may be threaded to allow the pressure sensing device 500 to be attached to a line or other transmission means in communication with the gas or fluid to be tested or measured. The gas or fluid being measured enters the port 525 and fills the interior volume 520u. When the interior volume 520u is filled, the fluid being measured is in contact with the upper side of the flexible diaphragm 530. Pressure exerted by the gas or fluid being measured is transmitted through the flexible diaphragm 530 to the enclosed volume 5201 of oil. The force applied to the oil by the flexible diaphragm 530 is transmitted throughout the oil and to the surfaces containing the oil, including the upper surface of diaphragms 565 and 570, and also a vent channel 575 which is in fluid communication with an underside of diaphragm 570. Although the fluid portion entering through port 525 contacts the flexible diaphragm and does not contact the pressure sensing die assembly 540, the fluid is nevertheless considered to be in fluid communication with the pressure sensing dies because the pressure of the fluid is communicated to the dies by the flexible diaphragm 530 and the oil in volume 5201.

Pressure sensing die assembly 540 may include several parts. Typically, the single pressure sensing die assembly 540 may include a single support structure 545 which is attached to the base plate 505, a single die 555 including first diaphragm 565 and second diaphragm 570, which die 555 is attached to the support structure 545, and at least one pressure sensitive electrical element in or on each of the diaphragms. The at least one pressure sensitive electrical element on each diaphragm is configured to exhibit a varying resistance responsive to deflection of the diaphragm. One or more electrical conductors are typically connected to the pressure sensitive electrical elements so that a voltage may be applied to the elements, and so that the resistance change of the pressure sensitive electrical element can be observed by the system monitoring the pressure.

As noted, in the embodiment of FIG. 5A, the diaphragms 565 and 570 of die assembly 540 are configured to perform different functions—diaphragm 565 is configured to measure the differential pressure between P1 and P2, and diaphragm 570 is configured to measure the common mode error experienced by die assembly 540. Die assembly 540 may include a support structure 545 which includes a hole or first aperture 550 which permits fluid communication between the fluid in hole 510, first chamber 567 in die assembly 540, and diaphragm 565. Pressure sensing die 555 may be mounted or bonded to the support structure 545 with a bonding adhesive or by other methods such as anodic bonding. The support structure 545 is bonded to the base plate 505 (which may also be termed a header) by an adhesive 560. The support structure 545 may be used to isolate the pressure sensing die 555 from sources of strain that are unrelated to pressure, such as thermal expansion that would occur between the pressure sensing die 555 and the base plate 505. An aperture or hole 510 is defined in the base plate 505 which is in gas or fluid communication with the underside of the diaphragm 565. The hole 510 is in communication with a section or portion of the fluid whose pressure P2 is to be measured and which comes in contact with an underside of diaphragm 565. The pressure sensing die 555 and the support structure 545 are preferably positioned over the hole 510 in base plate 505 such that the flow of fluid from hole 510 is not obstructed. Support structure 545 may be formed from glass or similar material which has a coefficient of thermal expansion closer to that of the silicon pressure sensing die 555 as compared to the coefficient of thermal expansion of the stainless steel making up the base plate 505. For example, the support structure 545 may be formed from silicon, or other materials, such as glass or PYREX, which are chemically inert and can be bonded to die 555.

This matching of the coefficients of thermal expansion help reduce or prevent strain on the pressure sensing die 555 related to dissimilar rates of expansion between the die material and the base plate material. The support structure 545 may be bonded or attached to the base plate 505 by an appropriate adhesive 560 as known in the art. For example, bonding may be performed by a Silicone adhesive, epoxy, solder, braze or other commonly known techniques.

Figure 5B:
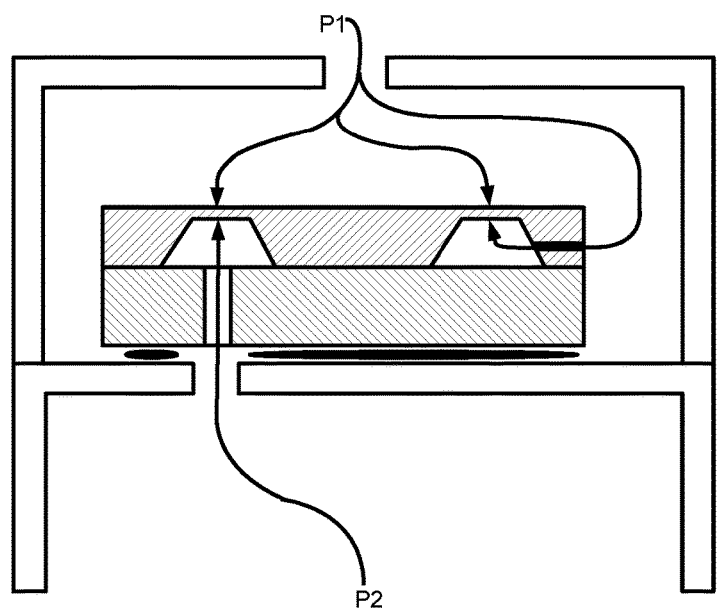
FIG. 5B is a sectional view of an embodiment of a differential pressure common mode compensation die arrangement including a single die with two diaphragms, which depicts the interaction of the pressures being measured, with the diaphragms.

The diaphragm 565 of pressure sensing die 555 may have pressure sensitive electrical elements, such as piezo-resistive resistor elements, in or on the diaphragm 565. The elements may be strategically placed in strain fields of the diaphragm. FIG. 5B shows how pressures P1 and P2 interact with the diaphragm 565. When force P2 is exerted on the underside of diaphragm 565 and force P1 is exerted on the top or upper side of diaphragm 565, the upper surface of the diaphragm of pressure sensing die 100 varies responsive to variations in the piezo-resistive elements. An electrical signal applied to the piezo-resistive elements will reflect the varied response of the elements, and will be representative of the differential force applied to the surface of the pressure sensing die 555. An electrical signal may be applied to the piezo-resistive elements via one or more electrical conductors such as bond wires or electrical conductive traces (not shown) or other electrical connections to the piezo-resistive elements of diaphragm 565. As will be understood, the bond wire may be directly or indirectly connected to other system circuitry, such as a control circuit, or converted to pressure data which may be stored, by way of non-limiting example, in an electronic memory.

As noted, die assembly 540 also includes diaphragm 570, which is configured to sense the common mode error experienced by the die assembly. FIG. 5B shows how pressures P1 and P2 interact with the diaphragm 570. Diaphragm 570 is part of die 555, which, as noted, is attached to support structure 545. Die 555 includes chamber 585, which is positioned over the support structure 545 away from hole 510 so that chamber 585 is not in fluid communication with hole 510. The adhesive (not shown) used to bond support structure 545 of die assembly 540 is configured to seal hole 510 and chamber 567 to prevent pressure P2 from being in fluid communication with diaphragm 570.

In an embodiment, die assembly 540 may include a vent between chamber 585 and the exterior of die assembly 540, which places the chamber 585 in fluid communication with pressure P1. The vent channel can be effected in a number of ways which do not detract from the invention. In an embodiment, the vent channel may be effected by an integral hole or passage in the support structure 545, or a hole or passage 575 in die 555, which extends from the chamber 585 and an exterior of the support structure 545, which places chamber 585 in fluid communication with pressure P1. In another alternative embodiment, the vent channel may be effected in the adhesive (not shown) or other bonding material which is used to bond die pressure sensing die 555 to support structure 545. The adhesive may be applied such that it forms a vent channel between chamber 585 and the exterior of the die assembly 540, such as by not applying adhesive to an area between the die 555 and the support structure 545 so that there is a gap between the elements that places the chamber 585 in fluid communication with pressure P1. In a further embodiment (not shown), the vent channel may be formed in the adhesive used to attach the support structure 545 to the base plate 505. In this embodiment, the support structure will include an aperture (not shown) that enables fluid communication between chamber 585 and the vent channel in the adhesive.

The diaphragm 570 of pressure sensing die 555 may have pressure sensitive electrical elements, such as piezo-resistive resistor elements, in or on the diaphragm 570. The elements may be strategically placed in strain fields of the diaphragm. When force P1 is exerted on both the lower side and upper side of diaphragm 570, the surface of the diaphragm varies and the piezo-resistive elements vary. An electrical signal applied to the piezo-resistive elements will reflect the varied response of the elements, and will be representative of the common mode error experienced by diaphragm 570. An electrical signal may be applied to the piezo-resistive elements via one or more electrical conductors such as bond wires or electrical conductive traces (not shown) or other electrical connections to the piezo-resistive elements of diaphragm 570. As will be understood, the bond wire may be directly or indirectly connected to other system circuitry, such as a control circuit, or converted to pressure data which may be stored, by way of non-limiting example, in an electronic memory.

The schematic diagram of FIG. 4 also represents an electrical circuit that may be implemented to output a common error corrected differential output, using the pressure sensitive electrical elements on the diaphragms 565 and 570. As noted, FIG. 4 depicts a schematic 400 of two bridge circuits D1 (410) and D2 (450), which in an embodiment may be in or on diaphragms 565 and 570. Bridge circuit D1 (410) may correspond to a circuit defined in or on diaphragm 565, and includes piezo-resistive elements in a bridge pattern, which elements comprise variable resistors whose resistances vary with the flexing of the diaphragm 565. Bridge circuit D2 (450) may correspond to a circuit defined in or on diaphragm 570, and includes piezo-resistive elements in a bridge pattern, which elements comprise variable resistors whose resistances vary with the flexing of the diaphragm 570. As shown in FIG. 4, bridge circuits D1 and D2 may have an excitation voltage Ex+ (430) and Ex− (440) applied to them, which may be effected by a suitable electrical connection such as suitable electrical conductors connected to the bridge circuits.

In the embodiment shown in FIG. 4, bridge circuits D1 and D2 are electrically connected by connector 420, which may also be effected by a suitable electrical connection such as an electrical conductor between the bridge circuits. In particular, the electrical connector 420 is configured to connect the common mode error output of D2 to the output of the differential pressure sensed by D1 so that the output at Out+ (46) and Out− (420) is the common mode error corrected differential pressure measured by the combination of the bridge circuits. In a pressure sensor according to the embodiment of FIG. 5A, the electrical connector 420 and the other circuit members between resistive elements may be implemented on the die 555 using conductive lines or traces in the die. The piezo-resistive elements and conductive traces may be formed by differentially diffusing one or more dopants within the semiconductor material of the die to define the piezo-resistive elements and conductive circuit elements, using techniques and materials well known in the art. The conductive circuit elements may be representative of a conductive path in the semiconductor material to complete circuits including the piezo-resistive elements, and may also include contact pads for connecting external conductors to the circuit.

Figure 6:
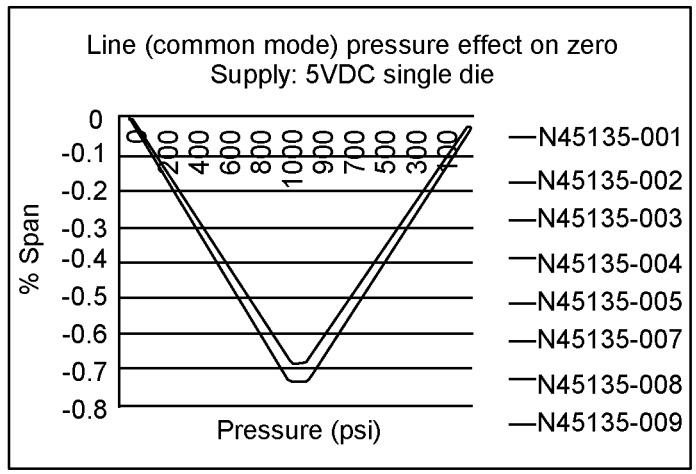
FIG. 6 is a graph depicting the common mode effect as observed on prior art differential pressure sensors.
Figure 7:
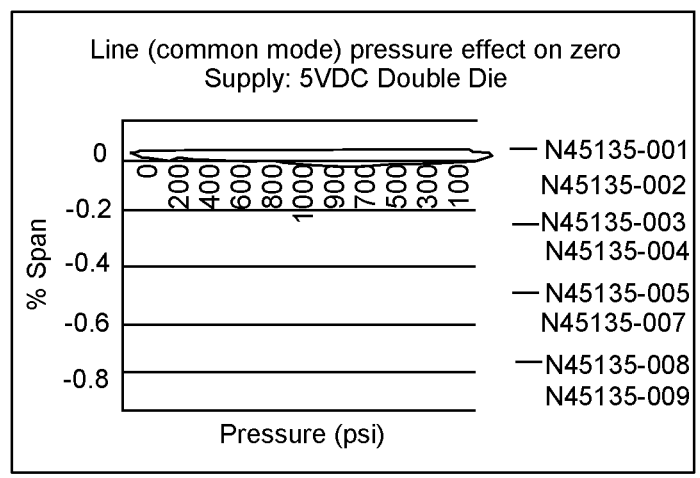
FIG. 7 is a graph depicting the common mode effect as observed on the corrected sensor of the embodiments of the disclosure.

FIG. 6 depicts a graph showing the amount of common mode error found in the output of eight differential pressure sensors of the same model, N45135-001 through N45135-005 and N45135-007 through N45135-009. As shown, a consistent common mode error was observed in all of the differential pressure sensors at different pressures, indicating that common mode errors are consistent and reproducible throughout sensors of the same model (i.e., sensors with the same construction using the same materials and parts). At high pressure such as 1000 psi, a marked common mode error of 0.7% of the span, the range between the upper and lower limits of the measurable pressure range, is observable in all of the differential pressure sensors FIG. 7 depicts a graph showing the amount of common mode error found in the output of four different pairs of differential pressure sensor combinations of the same model, N45135-001 through N45135-005 and N45135-007 through N45135-009, in which the combinations were configured to provide a corrected sensor output as discussed in relation to the embodiments of FIGS. 3 and 5. For this graph, the pairs of differential pressure sensors were configured within a sensor housing such that one of the sensors in the pair measured the differential pressure (e.g., differential pressure between pressures P1 and P2), the other of the sensors in the pair measured the common mode error experienced by the sensor (e.g., the common mode error experienced by the sensor receiving P1 on both sides of the diaphragm, as discussed in relation to FIGS. 3 and 5), and the output of the combination of the pair of sensors was a corrected differential pressure. For example, as shown, sensor N45135-001 and N45135-002 were paired together, with one of the pair being configured to sense differential pressure and the other of the pair sensing only common mode error. As shown in the graph, the common mode error found in the differential pressure outputs was greatly reduced throughout the pressure ranges when one of the pairs of differential pressure sensors was used to sense the common mode error and that error was used to correct the differential pressure output. Even at high pressure such as 1000 psi, the output of the combination of sensors experienced minimal common mode effects when compared to the common mode error effects shown in FIG. 6.

Dies 355 and 385 in the embodiment of FIG. 3A, and die 555 in the embodiment of FIG. 5A, may each be a semiconductor die, of single-crystal silicon or other suitable semiconductor material. The semiconductor die may be manufactured by dicing a semiconductor wafer into rectangular pieces. According to one embodiment, each semiconductor die is based on a semiconductor cube having an outside dimension of about 2 millimeters (mm). A region having a lesser thickness (i.e., the chamber of the die below the diaphragm) is defined by removing a portion of the semiconductor cube to define a region forming diaphragm. The portion may be removed by etching or other processes known in the art. For example, anisotropic etching may be used to produce a substantially square diaphragm having an outside dimension of 1 mm according to an exemplary embodiment.

Similarly, the support structure and apertures may be formed by an etching processes and may produce an aperture having a cross sectional profile resembling a square having rounded corners. In an embodiment, the apertures 342 and 376 of FIG. 3A may be created to have an inside dimension that is equal to or slightly larger than the perimeter dimensions of the diaphragms 365 and 395. The aperture 550 of FIG. 5A may be formed by similar processes.

Support structures may be bonded to the semiconductor die using any suitable adhesive. By way of example, the support structures in FIGS. 3A and 5A may be anodically bonded to a polysilicon layer on the semiconductor die, or the support structures may be anodically bonded to exposed semiconductor material on the underside of semiconductor die. Depending on the respective materials of the die and the support structures, other bonding processes, such as anodic bonding, silicon fusion bonding, glass frit bonding or other techniques may be used to bond support structures to the semiconductor die.

The operation of the differential pressure sensors of FIGS. 3A and 5A will now be described. With respect to differential pressure sensor 300 of FIG. 3A, it is incorporated into a structure, such as a differential pressure sensor package, that provides a first fluid port 310 and a second fluid port 325. The first fluid port receives a first section or portion of a fluid under pressure (first fluid under a first pressure), and the second fluid port receives a second section or portion of the fluid under pressure (second fluid under a second pressure). The first and second portions of fluid fill the ports 310 and 325, respectively, and apply pressure to respective lower and upper sides of diaphragm 365. Diaphragm 365 flexes and undergoes strain, which results in changes in resistance of pressure sensitive electrical elements in or on the diaphragm. The flexing of the diaphragm 365 is indicative of the uncorrected differential pressure, which may be determined by processing of signals indicative of resistance of the pressure sensitive electrical elements on the diaphragm 365. The second section of fluid that fills port 325 also applies pressure to the lower and upper sides of diaphragm 395. Diaphragm 395 flexes and undergoes strain, which results in changes in resistance of pressure sensitive electrical elements in or on the diaphragm. The flexing of the diaphragm 395 is indicative of the common mode error associated with die assembly 370, which may be determined by processing of signals indicative of resistance of the pressure sensitive electrical elements on the diaphragm 365. As shown in FIG. 4, the bridge circuits in or on diaphragm 365 and 395 may be connected so that when a voltage is applied to the circuit, a common error mode corrected differential pressure is output based on the bridge circuits. Processing devices in electrical communication with the bridge circuits, such as through a bonding wire(s) or other electrical conductors or electrical conductive traces, may determine a differential pressure value based on data from the elements on the diaphragms. The operation of differential pressure sensor 500 of FIG. 5A is similar to the operation of differential pressure sensor 300, except that differential pressure sensor 500 includes a single die that has two diaphragms, rather than two separate dies, each of which has a diaphragm, as in differential pressure sensor 300.

As shown in FIGS. 3A and 5A in relation to the embodiments of differential pressure sensors 300 and 500, the die may be installed on a base plate within an upper housing which includes a flexible diaphragm in the enclosed volume formed by the base plate and upper housing, which isolates the die from the fluid whose pressure is being measured. The flexible diaphragm may be used where the fluid is corrosive or otherwise incompatible for direct contact with die assemblies 340, 370, or 540. When the cavity diaphragm is used, the portion of the enclosed volume below the flexible diaphragm and in contact with the die assemblies is filled with non-corrosive oil. When the fluid to be measured fills ports 325 or 525, it fills the upper portions of the enclosed volumes, which applies pressure to the flexible diaphragm which then transmits that pressure to the diaphragms on the pressure sensor die assemblies. However, if the fluid being measured is non-corrosive and not otherwise incompatible for direct contact with the die assemblies, the flexible diaphragm may not be necessary and the fluids may fill the enclosed volumes and directly contact the diaphragms therein.

In embodiments of the differential pressure sensor in which a flexible diaphragm is used to isolate the sensor from the fluid to be measured, the portion of the enclosed volume in the housing that includes the pressure sensor is filled with a fluid such as silicon oil, which is compatible with silicon die, and then sealed. The enclosed volume containing the oil includes the flexible diaphragm as one wall defining the volume, and rigid walls defined by the base plate and the upper housing. The rigid walls are rigid by virtue of relative thickness, such as being of relatively thick steel, or of glass or silicon of the support structures. Because the walls are rigid, pressure applied to the upper portion of the enclosed volume causes the flexible diaphragm to flex rather than the walls, which then causes deflection of the sensor die diaphragms. The side and bottom walls must be sufficiently thick to be rigid, so that the pressure applied to the exterior of the flexible diaphragm is transferred to the diaphragm of the semiconductor die, and does not serve to deform the walls of the upper housing.

Figure 8A:
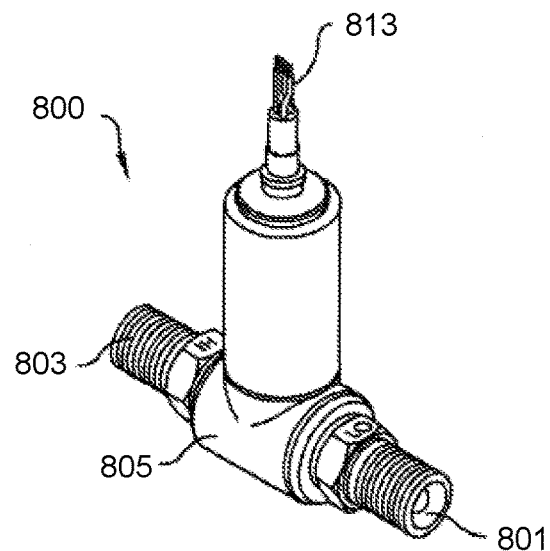
FIG. 8A is an isometric view of a housing and differential pressure sensor according to an embodiment of a differential pressure device of the disclosure.
Figure 8B:
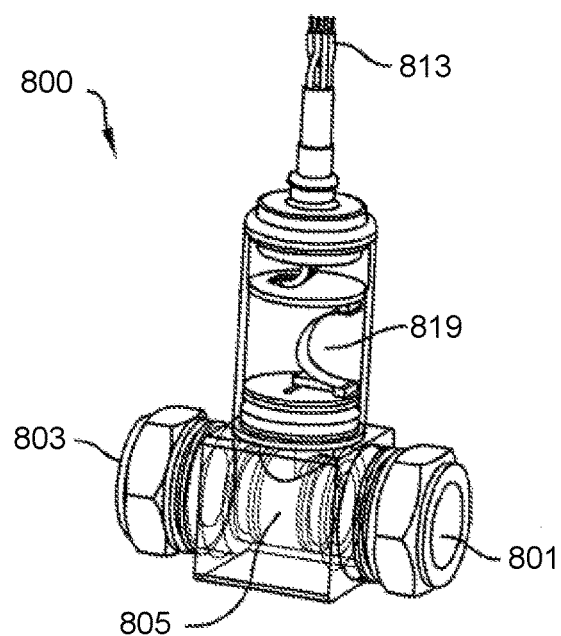
FIG. 8B is a ghost view of the housing and differential pressure sensor of FIG. 8A.

FIGS. 8A and 8B illustrate a package 800 which may be configured to house the differential pressure sensors embodiments of FIGS. 3A and 5A. Package 800 includes a main housing 805 which defines an interior volume for receiving the differential pressure sensor, which may be one of the sensors shown in FIGS. 3A and 5A. The package 800 includes a first fluid port 801 and a second fluid port 803 which receive a first and second fluid, respectively. Fluid ports 801, 803 may include a flanged or ridged end for receiving a hose or tubing carrying the first and second fluids to be measured according to the embodiment shown in FIG. 8A and FIG. 8B, fluid ports 801, 803 are threaded to receive a fitting of the hose or tubing.

The package 800 includes an electrical circuit region 819 which includes circuitry in electrical communication with the circuitry of the differential pressure sensor. For compensated applications, other chips and circuitry are typically installed along side the pressure sensor in the housing. This circuitry is used to calibrate the sensor and also provide analog or digital outputs that are commonly used for sensors. The electrical circuit region 819 may be in electrical communication with conductive terminals, such as automotive style connector wires 813 to allow electrical connection of system circuitry via a plug or wiring harness. Circuit region 819 is located within a housing. Circuit region 819 is isolated from the fluids being tested within the main housing 805. The upper and lower housings may be so configured to provide that the circuit region is thus physically isolated from the fluids being tested as well as oil or other fluids used to transmit force to the semiconductor diaphragm.

Figure 9:
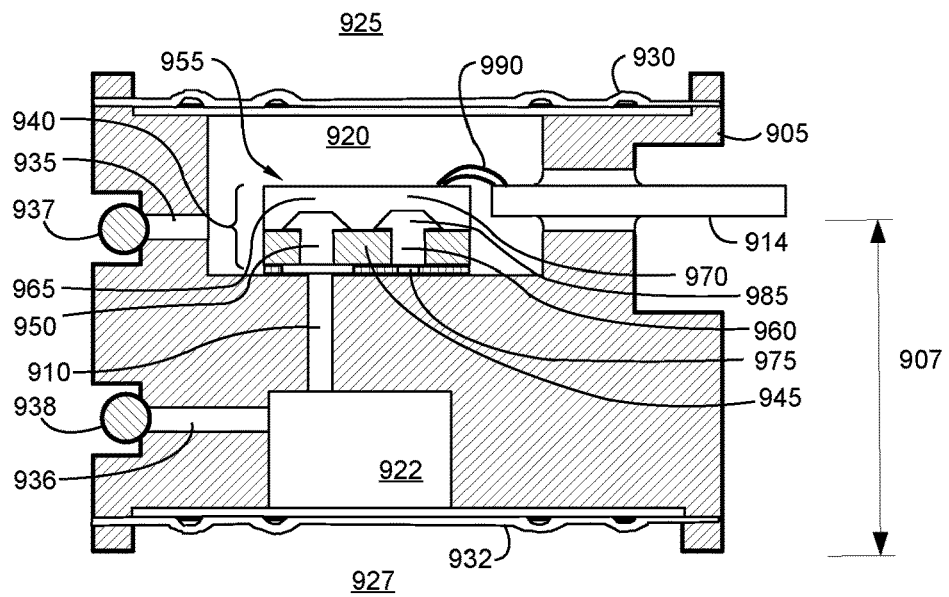
FIG. 9 is a sectional view of a differential pressure device having a single die with two diaphragms, according to an embodiment of the disclosure.

FIG. 9 is a cross sectional view of an isolated, oil-filled pressure sensor 900 which includes a single pressure sensing die with two separate diaphragms, which is similar in structure and operation to the oil-filled pressure sensor of FIG. 5A. Thus, the disclosure relating to FIG. 5A generally applies to the structure of FIG. 9. The pressure sensor 900 provides common mode error corrected differential pressure measurement. In the embodiment of FIG. 9, the pressure sensor 900 includes a pressure sensing die assembly 940 which includes a pressure sensing die 955 that includes integral diaphragms 965 and 970. The diaphragms have pressure sensitive electrical elements, such as piezo-resistive elements, defined in the semiconductor which exhibit varying electrical resistance based on the force applied by pressure on the diaphragm in the semiconductor pressure die 955. The lower surface of the semiconductor pressure die is supported by a support structure 945. The support structure 945 may have aperture 950 defined therethrough, aperture 950 being aligned with diaphragm 965 to allow oil that enters through aperture 950 to come into fluid communication with the lower surface of diaphragm 965. In an embodiment, support structure 945 may also include aperture 950 defined therethrough, aperture 950 being aligned with chamber 985.

In an embodiment, the support structure 945, or the die 955, may include a vent channel that places chamber 985 in fluid communication with enclosed volume 920. As discussed in detail in relation to FIG. 5A, the vent channel can be effected in a number of ways which do not detract from the invention. In the embodiment shown in FIG. 9, the vent channel 975 may be formed in the attachment material used to attach support structure 945 to the base plate 907. In this embodiment, support structure may include aperture 950, which provides for fluid communication between the vent channel formed in the attachment material and chamber 985. In other embodiments, the vent channel may comprise a passage or aperture in the support structure 945 or the die 955 which enables fluid communication between chamber 985 and volume 920. Aperture 950 may not be necessary in some embodiments, such as if the vent channel is effected by an aperture in the die 955 which places chamber 985 in fluid communication with volume 920. In another embodiment, the vent channel 975 may be effected in the adhesive (not shown) or other bonding material which is used to bond die pressure sensing die 955 to support structure 945. In another embodiment, the support structure 945 or the die 955 may include an integral vent channel, such as a hole or channel formed or otherwise created on a bottom surface of die 955 or on a top surface of support structure 945, which places the chamber 985 in fluid communication with volume 920.

In the embodiment of FIG. 9, the pressure sensor 900 is configured so that the fluid sections being measured to do not directly contact either of the pressure sensor diaphragms. The pressure sensor body 905 and flexible diaphragm 930 define enclosed volume 920, which contains the pressure sensor diaphragms. While enclosed volume 920 is physically isolated from the fluid being measured, it is nevertheless in fluid communication with the fluid by flexible diaphragm 930 and oil within volume 920. Oil fill port 935 is used to fill enclosed volume 920, then is sealed with welding ball 937. The pressure sensor body 905 and flexible diaphragm 932 define enclosed volume 922. While enclosed volume 922 is physically isolated from the fluid being measured, it is nevertheless in fluid communication with the fluid by flexible diaphragm 932 and oil within enclosed volume 922. Enclosed volume 922 is thus in fluid communication with aperture 950 and the underside of diaphragm 965. Oil fill port 936 is used to fill enclosed volume 922, then is sealed with welding ball 938.

The pressure sensor 900 includes areas 925 and 927 for receiving portions of the fluid whose pressure is to be measured. A first fluid enters area 925 and exerts a force due to pressure against the flexible diaphragm 930. The flexible diaphragm 930 flexes and transmits the force applied against it to the oil within enclosed volume 920. The pressure is transmitted throughout the oil in the oil-filled volume 920, to the upper sides of diaphragms 965 and 970, and to the underside of diaphragm 970 through a vent channel 975 and through aperture 950 in the support structure. As noted, in the embodiment shown in FIG. 9, the vent channel may be formed in the attachment material used to attach support structure 945 to the base plate 907. In other embodiments, the vent channel may comprise a passage or aperture in the support structure or the die 955 which enables fluid communication between chamber 985 and volume 920. A second fluid enters area 927 and exerts a force due to pressure against flexible diaphragm 932. The flexible diaphragm 932 flexes and transmits the force applied against it to the oil within oil-filled volume 922. The pressure is transmitted throughout the oil in oil-filled volume 922, including through the aperture 910, and to the region defined by the aperture 950 in the support structure 945, and to the lower surface of the diaphragm 965 of semiconductor pressure sensing die 955.

The pressure sensor includes sensor housing or body 905. The sensor housing 905 includes a base plate 907, which may be defined as the region of the sensor body which has a first side that is in fluid communication with a first fluid, and a second side which is in fluid communication with a second fluid. In an embodiment, the base plate 907 may be defined as the entire portion of the sensor housing 905 below opening 935 and output pin 914, while in another embodiment the base plate 907 may be defined as the portion of the sensor housing 905 between volume 920 and volume 922. While the embodiment of FIG. 9 includes a base plate that comprises a region of a sensor body, in other embodiments, such as in FIGS. 3A and 5A, the base plate may comprise a defined piece of a sensor body. The fluid communication between the fluid being measured and the diaphragms may be direct or indirect, and in the embodiments which include flexible diaphragms 930 and 932, the communication between the fluid and the base plate 907 is indirect. Base plate 907 includes hole 910, which places the underside of diaphragm 965 in fluid communication with the second fluid. In the embodiment shown in FIG. 9, the enclosed volume 920 is defined by a first side of base plate 907, and pressure sensing die assembly 940 is attached to the first side of the base plate 907 within the enclosed volume 920.

The pressure sensor 900 may include an electrical output pin or conductor 914 which outputs the common mode corrected differential pressure. In an embodiment, the pressure may also include a printed circuit board (not shown), that is electrically connected to the diaphragms and which calculates the corrected differential pressure. The electrical output pin 914 may be connected to the diaphragms 965 and 970 by one or more electrical conductors or bond wires 990. Electrical output pin may provide an electrical output signal representative of the common mode corrected differential pressure value to external systems outside the differential pressure sensor 900.

While the embodiment of the package shown in FIG. 9 is used to house an oil-filled common error corrected differential pressure sensor, this is shown by way of example only. Other configurations, such as configurations which do not use oil-filled volumes to isolate the pressure sensors from the fluid being measured, may be used and contemplated by one of skill in the art.

Figure 10:
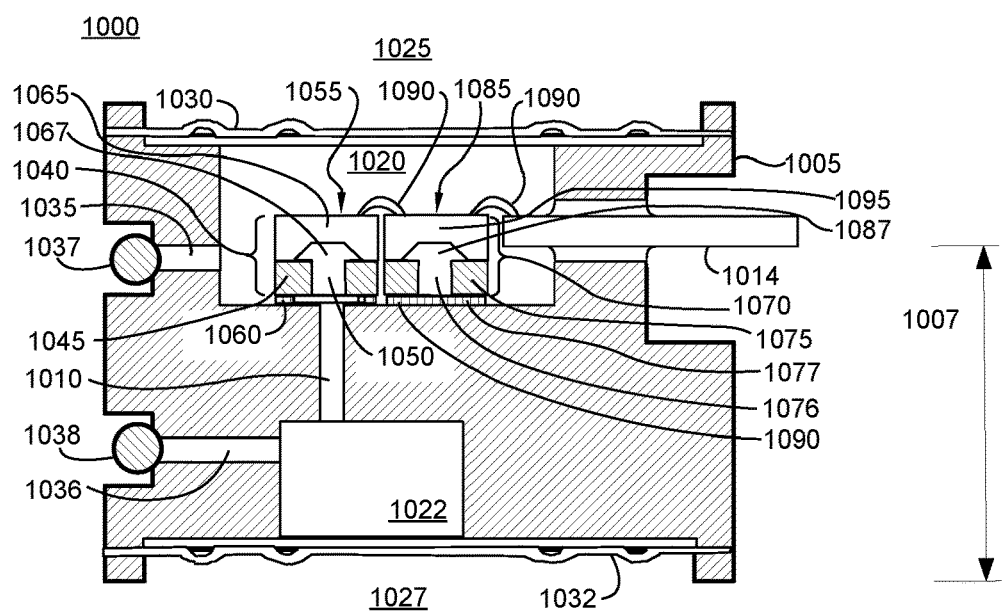
FIG. 10 is a sectional view of a differential pressure device having two dies, according to an embodiment of the disclosure.

FIG. 10 is a sectional view of a differential pressure device having two dies, according to an embodiment of the disclosure, which is similar in structure and function to the oil-filled pressure sensor of FIG. 3A. Thus, the disclosure relating to FIG. 3A generally applies to the structure of FIG. 10. The pressure sensor 1000 provides common mode error corrected differential pressure measurement. In the embodiment of FIG. 10, the pressure sensor 1000 includes a first pressure sensing die assembly 1040 which includes a pressure sensing die 1055 that includes integral diaphragm 1065. The lower surface of the pressure sensing die 1055 is supported by support structure 1045, which is attached to a first side of base plate 1007 of sensor body 1005. The pressure sensor 1000 includes also a second pressure sensing die assembly 1070 which includes a pressure sensing die 1085 that includes integral diaphragm 1095. The lower surface of the pressure sensing die 1085 is supported by support structure 1075, which may include aperture 1076. Diaphragms 1065 and 1095 each have pressure sensitive electrical elements, such as piezo-resistive elements, defined in the semiconductor which exhibit varying electrical resistance based on the force applied by pressure on the respective diaphragm. Diaphragms 1065 and 1095 may be electrically connected to each other and/or to output pins 1014 by the use of wire interconnections 1090.

Support structure 1045 may have an aperture 1050 defined therethrough, the aperture being aligned with diaphragm 1065 to allow oil that enters through aperture 1050 to come into fluid communication with the lower surface of diaphragm 1065.

In the embodiment shown in FIG. 10, the vent channel 1077 may be formed in the attachment material used to attach support structure 1075 to the base plate 1007. In an embodiment, the support structure 1075 may also include an aperture 1076. Support structure 1075 may include aperture 1076 in embodiments in which the aperture is necessary to provide fluid communication between the underside of diaphragm 1095 and a vent channel which places chamber 1087 in fluid communication with enclosed volume 1020. As discussed in detail in relation to FIG. 3A, the vent channel can be effected in a number of ways which do not detract from the invention. In the embodiment shown in FIG. 10, the vent channel 1077 may be formed in the attachment material used to attach support structure 1075 to the base plate 1007. In this embodiment, support structure may include aperture 1076, which provides for fluid communication between the vent channel formed in the attachment material and chamber 1087. In other embodiments, the vent channel may comprise a passage or aperture in the support structure 1075 or the die 1085 which enables fluid communication between chamber 1087 and volume 1020. Aperture 1076 may not be necessary in some embodiments, such as if the vent channel is effected by an aperture in the die 1085 which places chamber 1087 in fluid communication with volume 1020. In another embodiment, the vent channel 1077 may be effected in the adhesive (not shown) or other bonding material which is used to bond die pressure sensing die 1085 to support structure 1075. In another embodiment, the support structure 1075 or the die 1085 may include an integral vent channel, such as a hole or channel formed or otherwise created on a bottom surface of die 1085 or on a top surface of support structure 1075, which places the chamber 1087 in fluid communication with volume 1020.

In the embodiment of FIG. 10, the pressure sensor 1000 is configured so that the fluid sections being measured to do not directly contact either of the pressure sensor diaphragms. The pressure sensor includes enclosed volume 1020 which is defined by sensor body 1005 and flexible diaphragm 1030, which enclosed volume contains the pressure sensor diaphragms. While enclosed volume 1020 is physically isolated from the fluid being measured, it is nevertheless in fluid communication with the fluid by flexible diaphragm 1030 and oil within enclosed volume 1020. Oil fill port 1035 is used to fill enclosed volume 1020, then is sealed with welding ball 1037. The pressure sensor also includes enclosed volume 1022 which is defined by sensor body 1005 and flexible diaphragm 1032. While enclosed volume 1022 is physically isolated from the fluid being measured, it is nevertheless in fluid communication with the fluid by flexible diaphragm 1032 and oil within enclosed volume 1022. Enclosed volume 1022 is in fluid communication with port 1050 and the underside of diaphragm 1065. Oil fill port 1036 is used to fill enclosed volume 1022, then is sealed with welding ball 1038.

The pressure sensor 1000 includes areas 1025 and 1027, which include or receive the portions of the fluid whose pressure is to be measured. A first fluid enters area 1025 and exerts a force due to pressure against the flexible diaphragm 1030. The flexible diaphragm 1030 flexes and transmits the force applied against it to the oil within enclosed volume 1020. The pressure is transmitted throughout the oil in the oil-filled volume 1020, to the upper sides of diaphragms 1065 and 1095, and to the underside of diaphragm 1095 through a vent channel such as vent channel 1077, which is in fluid communication with aperture 1076 and chamber 1087. A second fluid in area 1027 exerts a force due to pressure against flexible diaphragm 1032. The flexible diaphragm 1032 flexes and transmits the force applied against it to the oil within oil-filled volume 1022. The pressure is transmitted throughout the oil in oil-filled volume 1022, including to the region defined by the aperture 1050 in the support structure 1045, and to the lower surface of the diaphragm 1065 of semiconductor pressure sensing die 1055.

The pressure sensor includes sensor housing or body 1005. The sensor housing 1005 includes a base plate 1007, which may be defined as the region of the sensor body which has a first side that is in fluid communication with a first fluid, and a second side which is in fluid communication with a second fluid. In an embodiment, the base plate 1007 may be defined as the entire portion of the sensor housing 1005 below opening 1035 and output pin 1014, while in another embodiment the base plate 1007 may be defined as the portion of the sensor housing 1005 between volume 1020 and volume 1022. While the embodiment of FIG. 10 includes a base plate that comprises a region of a sensor body, in other embodiments, such as in FIGS. 3A and 5A, the base plate may comprise a defined piece of a sensor body. The fluid communication between the fluid being measured and the diaphragms may be direct or indirect, and in the embodiments which include flexible diaphragms 1030 and 1032, the communication between the fluid and the base plate 907 is indirect. Base plate 1007 includes hole 1010, which places the underside of diaphragm 1065 in fluid communication with the second fluid. In the embodiment shown in FIG. 10, the enclosed volume 1020 is defined by a first side of base plate 1007, and pressure sensing die assemblies 1040 and 1070 are attached the side of the base plate 1007 within the enclosed volume 1020.

The pressure sensor 1000 may include an electrical output pin or conductor 1014 which outputs the common mode corrected differential pressure. In an embodiment, the pressure may also include a printed circuit board (not shown), that is electrically connected to the diaphragms and which calculates the corrected differential pressure. The electrical output pin 1014 may be connected to the diaphragms 1065 and 1095 by one or more electrical conductors or bond wires 1090. Electrical output pin or pins 1014 may provide an electrical output signal representative of the common mode corrected differential pressure value to external systems outside the differential pressure sensor 1000.

While the embodiment of the package shown in FIG. 10 is used to house an oil-filled common error corrected differential pressure sensor, this is shown by way of example only. Other configurations and used may be contemplated by one of skill in the art.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A differential pressure sensor comprising:
a sensor housing including a base plate having a hole therein, wherein a first side of the base plate is configured to be in fluid communication with a first fluid at a first pressure and a second side of the base plate is configured to be in fluid communication with a second fluid at a second pressure;
a first pressure sensing die assembly attached to the first side of the base plate in a first chamber of the sensor housing, said first pressure sensing die assembly including: (1) a first pressure sensing die including a first diaphragm having an upper side configured to be in fluid communication with said first fluid and a lower side configured to be in fluid communication with said hole in said base plate and said second fluid; and (2) at least one pressure sensitive electrical element, formed in or on the first diaphragm, configured to exhibit a varying resistance responsive to deflection of said first diaphragm representative of a differential pressure between the first pressure and the second pressure;
a second pressure sensing die assembly attached to the first side of the base plate in the first chamber of the sensor housing, said second pressure sensing die assembly including: (1) a second pressure sensing die including a second diaphragm having an upper side configured to be in fluid communication with said first fluid and a lower side configured to be in fluid communication with said first fluid; and (2) at least one pressure sensitive electrical element, formed in or on the second diaphragm, configured to exhibit a varying resistance responsive to deflection of said second diaphragm representative of a common mode error corresponding to the second pressure sensing die assembly;
one or more electrical conductors electrically connected to one or both of the at least one pressure sensitive electrical element of the first diaphragm and the at least one pressure sensitive electrical element of the second diaphragm.

2. The differential pressure sensor of claim 1, wherein the first pressure sensing die assembly further comprises a first support structure between said first pressure sensing die and said first side of said base plate, said first support structure including a first aperture configured to be in fluid communication with the hole in the base plate, the first diaphragm lower side, and the second fluid; and wherein the second pressure sensing die assembly further comprises a second support structure between said second pressure sensing die and said first side of said base plate, said second support structure including a second aperture configured to be in fluid communication with the second diaphragm lower side and the first fluid.

3. The differential pressure sensor of claim 2, wherein the first support structure is attached to the base plate with a die attach material configured to place the first aperture in fluid communication with the hole in the base plate and the second fluid but not the first fluid, and wherein the second support structure is attached to the base plate with a die attach material configured to form a vent channel in the die attach material which places the second aperture in fluid communication with the first fluid but not the second fluid.

4. The differential pressure sensor of claim 3, wherein the first support structure and the second support structure are made from one of silicon and glass.

5. The differential pressure sensor of claim 1, wherein the one or more electrical conductors are connected to a positive output terminal of said at least one pressure sensitive electrical element of the first diaphragm and a positive output terminal of said at least one pressure sensitive electrical element of the second diaphragm, and wherein the one or more electrical conductors are configured to subtract a reading from the positive output terminal of said at least one pressure sensitive electrical element of the second diaphragm from a reading from the positive output terminal of said at least one pressure sensitive electrical element of the first diaphragm to thereby output the common mode corrected differential pressure.

6. The differential pressure sensor of claim 1, wherein a negative output terminal of said at least one pressure sensitive electrical element of the first diaphragm is connected to a positive output terminal of said at least one pressure sensitive electrical element of the second diaphragm, thereby providing at a positive output terminal of said at least one pressure sensitive electrical element of the first diaphragm an electrical output representative of the common mode corrected differential pressure, wherein the electrical connector is connected to the positive output terminal of the at least one pressure sensitive electrical element of the first diaphragm.

7. The differential pressure sensor of claim 1, wherein each of said at least one pressure sensitive electrical element of the first diaphragm and said at least one pressure sensitive electrical element of the second diaphragm comprises a bridge circuit.

8. A differential pressure sensor comprising:
a sensor housing including a base plate having a hole therein, wherein a first side of the base plate is configured to be in fluid communication with a first fluid at a first pressure and a second side of the base plate is configured to be in fluid communication with a second fluid at a second pressure;

a pressure sensing die assembly attached to said first side of said base plate, said first pressure sensing die assembly including:
  a support structure including a first aperture and a second aperture defined therethrough, wherein the support structure is attached to the first side of the base plate and is configured to place the first aperture in fluid communication with the hole in the base plate and the second fluid;
  a pressure sensing die attached to the support structure, said pressure sensing die comprising:
    a first chamber defining a first diaphragm having a first diaphragm upper side configured to be in fluid communication with said first fluid and a first diaphragm lower side configured to be in fluid communication with said first aperture and said second fluid;
    at least one pressure sensitive electrical element formed in or on the first diaphragm, the at least pressure sensitive electrical element exhibiting a varying resistance responsive to deflection of said first diaphragm representative of a differential pressure between the first pressure and the second pressure;
    a second chamber defining a second diaphragm including a second diaphragm upper side configured to be in fluid communication with said first fluid and a second diaphragm lower side configured to be in fluid communication with said second aperture and said first fluid;
    at least one pressure sensitive electrical element formed in or on the second diaphragm, the at least one pressure sensitive electrical element exhibiting a varying resistance responsive to deflection of said second diaphragm representative of a common mode error corresponding to the pressure sensing die assembly;
  one or more electrical conductors electrically connected to one or both of the at least one pressure sensitive electrical element bonded to the first diaphragm and the at least one pressure sensitive electrical element bonded to the second diaphragm, said one or more electrical conductors configured to output a common mode error corrected differential pressure output.

9. The differential pressure sensor of claim 8, wherein the pressure sensing die includes a vent channel which is configured to permit fluid communication between the second chamber and the first fluid.

10. The differential pressure sensor of claim 8, wherein the support structure is attached to the base plate with a die attach material such that the first chamber is in fluid communication with the second fluid but not the first fluid, and such that a vent channel is formed in the die attach material which places the second chamber in fluid communication with the second aperture and the first fluid but not the second fluid.

11. The differential pressure sensor of claim 8, wherein the support structure is made from one of silicon and glass.

12. The differential pressure sensor of claim 8, wherein a negative output terminal of said at least one pressure sensitive electrical element of the first diaphragm is connected to a positive output terminal of said at least one pressure sensitive electrical element of the second diaphragm, thereby providing at a positive output terminal of said at least one pressure sensitive electrical element of the first diaphragm an electrical output representative of the common mode corrected differential pressure, wherein the electrical connector is connected to the positive output terminal of the at least one pressure sensitive electrical element of the first diaphragm.

13. The differential pressure sensor of claim 8, wherein a negative output terminal of said at least one pressure sensitive electrical element of the first diaphragm is connected to the positive output terminal of said at least one pressure sensitive electrical element of the second diaphragm by one of a bonding wire and a conductive trace on or in the pressure sensing die.

14. The differential pressure sensor of claim 8, wherein each of said at least one pressure sensitive electrical element of the first diaphragm and said at least one pressure sensitive electrical element of the second diaphragm comprises a bridge circuit.

15. A differential pressure sensor comprising:
  a sensor housing including a base plate having a hole therein, wherein a first side of the base plate is configured to be in fluid communication with a first fluid at a first pressure and a second side of the base plate is configured to be in fluid communication with a second fluid at a second pressure;
  at least one pressure sensing die assembly attached to said first side of said base plate, said at least one pressure sensing die assembly including:
    at least one support structure including a first aperture and a second aperture defined therethrough, wherein the at least one support structure is attached to the first side of the base plate and is configured to place the first aperture in fluid communication with the hole in the base plate and the second fluid;
    at least one pressure sensing die attached to the at least one support structure, said at least one pressure sensing die comprising:
      a first chamber defining a first diaphragm having a first diaphragm upper side configured to be in fluid communication with said first fluid and a first diaphragm lower side configured to be in fluid communication with said first aperture and said second fluid;
      at least one pressure sensitive electrical element formed in or on the first diaphragm, the at least pressure sensitive electrical element exhibiting a varying resistance responsive to deflection of said first diaphragm representative of a differential pressure between the first pressure and the second pressure;
      a second chamber defining a second diaphragm including a second diaphragm upper side configured to be in fluid communication with said first fluid and a second diaphragm lower side configured to be in fluid communication with said second aperture and said first fluid;
      at least one pressure sensitive electrical element formed in or on the second diaphragm, the at least one pressure sensitive electrical element exhibiting a varying resistance responsive to deflection of said second diaphragm representative of a common mode error corresponding to the at least one pressure sensing die assembly;
  one or more electrical conductors electrically connected to one or both of the at least one pressure sensitive electrical element bonded to the first diaphragm and the at least one pressure sensitive electrical element bonded to the second diaphragm, said one or more electrical conductors configured to output a common mode error corrected differential pressure output.

16. The differential pressure sensor of claim 15, wherein said at least one pressure sensing die assembly comprises a single pressure sensing die assembly, said at least one pressure sensing die comprises a single pressure sensing die, and said at least one support structure comprises a single support structure.

17. The differential pressure sensor of claim 16, wherein the single pressure sensing die includes a vent channel which is configured to permit fluid communication between the second chamber and the first fluid.

18. The differential pressure sensor of claim 16, wherein the single support structure is attached to the base plate with a die attach material such that the first chamber is in fluid communication with the second fluid but not the first fluid, and such that a vent channel is formed in the die attach material which places the second chamber and the second aperture in fluid communication with the first fluid but not the second fluid.

19. The differential pressure sensor of claim 15, wherein said at least one pressure sensing die assembly comprises a first pressure sensing die assembly and a second pressure sensing die assembly, said at least one pressure sensing die comprises a first pressure sensing die and a second pressure sensing die, and said at least one support structure comprises a first support structure and a second support structure, wherein:

said first pressure sensing die assembly comprises the first pressure sensing die attached to the first support structure, wherein the first support structure includes the first aperture defined therethrough and is attached to the base plate such that the first aperture is in fluid communication with the hole in the base plate, wherein the first pressure sensing die includes the first chamber defining the first diaphragm having the first diaphragm upper side configured to be in fluid communication with said first fluid, the first diaphragm lower side configured to be in fluid communication with said first aperture and said second fluid, and the at least one pressure sensitive electrical element formed in or on the first diaphragm; and said second pressure sensing die assembly comprises the second pressure sensing die attached to the second support structure, wherein the second pressure sensing die includes the second chamber defining the second diaphragm including the second diaphragm upper side configured to be in fluid communication with said first fluid, the second diaphragm lower side configured to be in fluid communication with said second aperture and said first fluid, and the at least one pressure sensitive electrical element formed in or on the second diaphragm.

20. The differential pressure sensor of claim 19, wherein the first support structure is attached to the base plate with a die attach material such that the first chamber and the first aperture are in fluid communication with the second fluid but not the first fluid, and wherein the second support structure is attached to the base plate with a die attach material such that a vent channel is formed in the die attach material which places the second chamber and the second aperture in fluid communication with the first fluid but not the second fluid.

* * * * *